United States Patent
Watanabe et al.

(10) Patent No.: US 8,363,251 B2
(45) Date of Patent: Jan. 29, 2013

(54) IMAGE FORMING APPARATUS, PRINT DATA GENERATION METHOD AND COMPUTER PROGRAM FOR FORMING AN IMAGE WITH HALFTONE PROCESSING THAT USES CONSTRAINT DATA

(75) Inventors: Yumi Watanabe, Yokohama (JP); Tomokazu Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 943 days.

(21) Appl. No.: 12/424,816

(22) Filed: Apr. 16, 2009

(65) Prior Publication Data

US 2009/0268240 A1 Oct. 29, 2009

(30) Foreign Application Priority Data

Apr. 25, 2008 (JP) .................... 2008-116293

(51) Int. Cl.
*G06F 3/12* (2006.01)
*G06K 1/00* (2006.01)

(52) U.S. Cl. ........................... 358/1.15; 358/1.9

(58) Field of Classification Search .............. 358/1.14, 358/1.15, 1.9, 2.1, 3.03, 3.04, 3.05, 3.06, 358/3.13, 3.16, 3.18, 3.21, 3.22, 3.23, 3.26, 358/505, 534, 536, 540, 465, 466; 382/275, 382/112, 251, 252, 260, 172, 167, 165, 237, 382/268, 270, 299

See application file for complete search history.

(56) References Cited

U.S. PATENT DOCUMENTS

| 5,594,478 A | * | 1/1997 | Matsubara et al. | ............. 347/41 |
| 6,874,864 B1 | | 4/2005 | Maeda et al. | |
| 7,343,291 B2 | * | 3/2008 | Thumpudi et al. | ............. 704/500 |
| 7,651,206 B2 | * | 1/2010 | Hawkins et al. | ............. 347/73 |
| 8,253,974 B2 | * | 8/2012 | Watanabe | ............. 358/1.8 |
| 2009/0310150 A1 | * | 12/2009 | Marumoto | ............. 358/1.8 |

FOREIGN PATENT DOCUMENTS

JP 2002-096455 A 4/2002

OTHER PUBLICATIONS

R. Floyd et al., "An Adaptive Algorithm for Spatial Grey Scale," SID International Symposiun Digest of Technical Papers, vol. 4.3, pp. 36-37 (1975).

* cited by examiner

*Primary Examiner* — Gabriel Garcia
(74) *Attorney, Agent, or Firm* — Fitzpatrick, Cella, Harper & Scinto

(57) ABSTRACT

An image forming apparatus that converts image data into print data is provided. The apparatus includes a conversion unit configured to generate first and second print data from the image data using an error diffusion method, each piece of second print data corresponding to one of the plurality of passes; and a printing unit configured to print the second print data. The conversion unit converts the image data into the first print data using the error diffusion method, generates constraint specifying the non-print pixels in the first print data as non-print pixels in the second print data, and converts the image data into the plurality of pieces of second print data, each piece of second print data being used in one of the plurality of passes, through an error diffusion method with the constraint. The printing unit prints the second print data in each of the plurality of passes.

7 Claims, 22 Drawing Sheets

F I G. 1
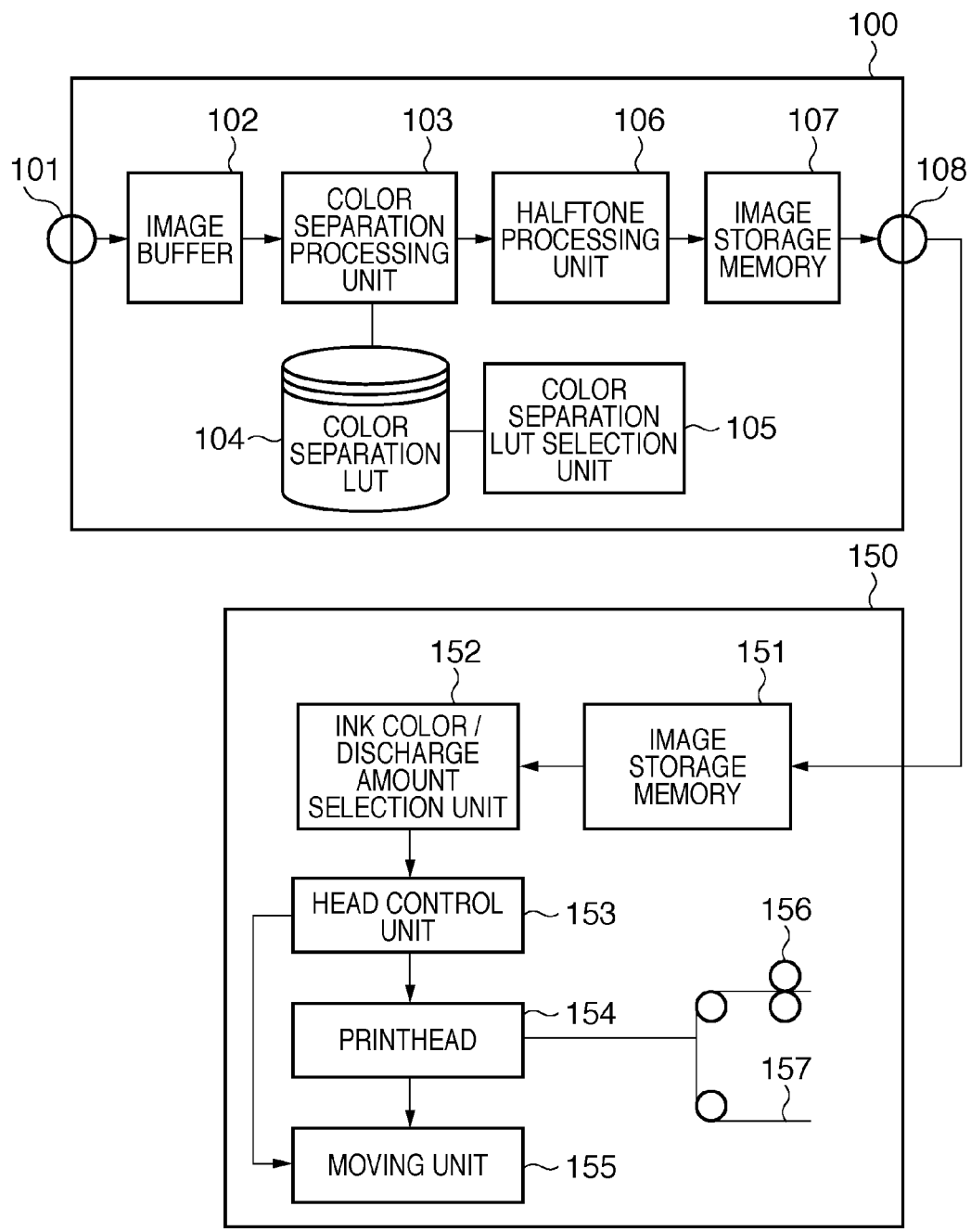

FIG. 21

IMAGE FORMING APPARATUS, PRINT DATA GENERATION METHOD AND COMPUTER PROGRAM FOR FORMING AN IMAGE WITH HALFTONE PROCESSING THAT USES CONSTRAINT DATA

BACKGROUND OF THE INVENTION

1. Field of the Invention

The present invention relates to an image forming technique, and particularly to a technique that uses multi-pass printing to form an image with a lower tone than an input image.

2. Description of the Related Art

There are various types of recording apparatuses, which record desired information such as text, images, and so on onto a sheet-shaped recording medium such as recording paper or film, used as information output apparatuses in word processors, personal computers, facsimile devices, and so on. Among these, a type that forms text and images upon a recording medium by depositing printing material onto the recording medium has been put into practical use; a representative example of such a type is an image forming apparatus such as an inkjet recording apparatus.

In inkjet recording apparatuses, the heads are sometimes provided with nozzle groups, in which multiple ink nozzles capable of discharging the same color and density of ink are packed in an array in order to improve printing speed, enhance image quality, and so on. Furthermore, it is customary for such nozzle groups, which are capable of discharging inks of the same color but different densities, changing the discharge amount of inks of the same color and density between several levels, or the like, to be provided for each different color of ink. FIG. 17 is a diagram illustrating an example of printing using multiple nozzles. A multi-nozzle head 1701 includes eight nozzles 1702. The nozzles 1702 discharge ink droplets 1703 toward a print region 1704.

The error diffusion method proposed by R. Floyd et al. ("An adaptive algorithm for spatial gray scale," SID International Symposium Digest of Technical Papers, Vol. 4.3, 1975, pp. 36-37) can be used by such an image forming apparatus as an image processing method that converts multi-valued input image data into print data, which corresponds to a recording signal for dots. This error diffusion method diffuses error arising in a pixel during a binary conversion process to peripheral pixels that will be processed thereafter, so that the data gradually changes from one color to another.

Furthermore, Japanese Patent Laid-Open No. 2002-096455 (U.S. Pat. No. 6,874,864) proposes a method regarding printing control for determining the formation order and arrangement when an image whose number of tones has been converted is formed by an image forming apparatus. With this technique, image processing is combined with the printing control, making it possible to form images at high speeds while suppressing degradation in image quality due to unprinted stripes, density unevenness, and so on. To be more specific, this patent document proposes a multi-pass recording method whereby multiple main scans in the same main scanning direction are made by different nozzle groups in the print regions of a predetermined recording medium and an image is formed as a result of the main scans.

Hereinafter, the multi-pass recording method shall be described with reference to FIG. 18. FIG. 18 is a diagram illustrating an example of the multi-pass recording method. With the multi-pass recording method, printing is performed by making multiple main recording scans in the print region 1704. Eight nozzles in the multi-nozzle head 1701 are divided into four nozzles on the upper side in the paper feed direction (an upper nozzle group), and four nozzles on the lower side in the paper feed direction (a lower nozzle group). The nozzle groups take turns making a single main recording scan in the same print region. Each nozzle 1702 prints approximately half of the number of dots contained in the image data, based on a predetermined image data arrangement for that image data. The printing of the image data is completed by filling in, during the second scan, the remaining dots of the image that was formed earlier.

A method that utilizes masking patterns exists as a method for calculating the print data for each pass. Each pass has a different masking pattern, and each pixel in the overall print region is allocated to one of the masking patterns. Only the pixels that correspond to the pixels allocated to the masking pattern of that pass are printed. A hound's tooth check pattern, illustrated in FIG. 19, is commonly used as the masking pattern. FIG. 19 is a diagram illustrating an example of a masking pattern. The printing of the print region is completed by a first scan that prints the hound's tooth check pattern and a second scan that prints the inverse of the hound's tooth check pattern. In the upper section of FIG. 19, the first pass of printing is performed in a print region 1901 using a lower nozzle group 1903. Here, only the dots corresponding to the hound's tooth pattern (the hatched circles) are printed. In the middle section of FIG. 19, the second pass of printing is performed in the print region 1901 using an upper nozzle group 1904. At the same time, the first pass of printing is performed in a print region 1902 using the lower nozzle group 1903. Here, only the dots corresponding to the inverse of the hound's tooth pattern (the white circles) are printed. Finally, in the lower section of FIG. 19, the second pass of printing is performed in the print region 1902 using the upper nozzle group 1904. Here, only the dots corresponding to the hound's tooth pattern (the hatched circles) are printed.

With such a multi-pass recording method, the ink discharge amount and the influence of unevenness in the discharge direction are halved, and thus overprinted stripes, unprinted stripes, and so on are not very noticeable in the formed image. This significantly alleviates density unevenness.

With the multi-pass recording method that uses masking patterns, the total of the print data of the passes is equivalent to the original binary image data. However, when a paper feed error occurs, the graininess of the image increases, and the quality of the output image dramatically drops. This phenomenon shall be described using FIG. 20. FIG. 20 is a diagram illustrating an example of the state of the multi-pass recording method in the case where a paper feed error has occurred. When the print data for each pass is calculated for a binary image 2001 using a pass masking pattern 2002, first pass print data 2003 and second pass print data 2004 are obtained. Here, in the case where a paper feed error has occurred during the printing of the second pass print data 2004, the print result ends up as the output image 2005. Compared to the original binary image 2001, the graininess of this image has increased significantly.

Degradation in the image quality with a multi-pass recording method that uses masking patterns causes the dispersity of the dots printed in each pass to decrease, and is thus also the cause of a drop in dispersity in the arrangement of dots in the output image when a paper feed error occurs.

The present invention increases the dispersity of the dot arrangement in an image formed using the multi-pass recording method, thereby reducing degradation in the image quality caused by a paper feed error occurring in the image forming apparatus.

SUMMARY OF THE INVENTION

According to one aspect of the present invention, an image forming apparatus that converts image data into print data that contains print pixels and non-print pixels, divides the print data into a plurality of passes, and prints the print data, is provided. The apparatus includes a conversion unit configured to generate first print data and a plurality of pieces of second print data by converting the image data using an error diffusion method, each piece of second print data corresponding to one of the plurality of passes; and a printing unit configured to print the plurality of pieces of second print data. The conversion unit performs a first conversion that converts the image data into the first print data using the error diffusion method, generates constraint data specifying the non-print pixels in the first print data as non-print pixels in the second print data, and performs a second conversion that converts the image data into the plurality of pieces of second print data, each piece of second print data being used in one of the plurality of passes, through an error diffusion method that uses the constraint data. The printing unit forms an image expressed by the image data by printing, in each of the plurality of passes, the piece of second print data that corresponds to the pass.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a functional block diagram illustrating an example of the configuration of an image forming apparatus 100 according to a first embodiment.

FIG. 21 is a diagram illustrating an example of the progress of constraints applied and print data in each pass, according to the first embodiment.

DESCRIPTION OF THE EMBODIMENTS

Figure 2:
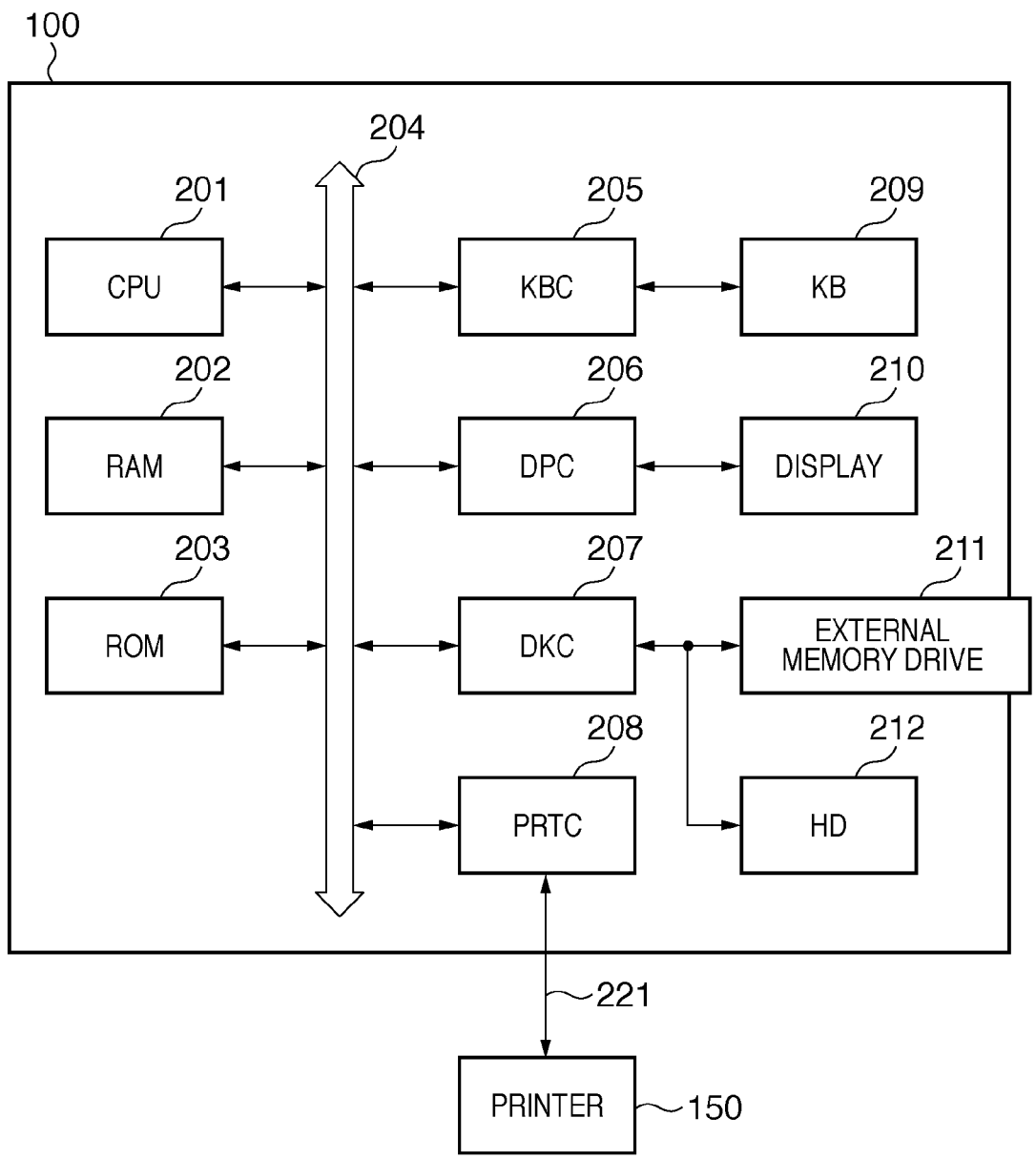
FIG. 2 is a block diagram illustrating an example of the configuration of the image forming apparatus 100 according to the first embodiment.

Embodiments of the present invention shall be described hereinafter with reference to the attached drawings.

First Embodiment

FIG. 1 is a functional block diagram illustrating an example of the configuration of an image forming apparatus 100 according to a first embodiment.

The image forming apparatus 100 includes an image buffer 102, a color separation processing unit 103, a color separation look-up table (LUT) 104, a color separation LUT selection unit 105, a halftone processing unit 106, and an image storage memory 107.

The image buffer 102 stores image data input into an input terminal 101. The color separation processing unit 103 separates the colors of color image data that has been stored into the colors of ink in the printer. The color separation look-up table 104 is referred to by the color separation processing unit 103 when performing color separation. The color separation LUT selection unit 105 allows a user to select his/her preferred color separation. The halftone processing unit 106 calculates print data for each pass used in multi-pass recording from multi-tone image data stored in the image buffer 102. The image storage memory 107 stores the print data that has undergone the halftone processing. The print data is output to an output terminal 108, and transferred to a printer 150.

The printer 150 includes an image storage memory 151, an ink color/discharge amount selection unit 152, a head control unit 153, a printhead 154, a moving unit 155, and a conveying unit 156. The printhead 154 moves vertically and horizontally relative to a recording medium 157, thereby forming an image upon the recording medium 157. The printhead 154 can use a wire dot system, a thermal system, a heat transfer system, or an inkjet system; each includes at least one nozzle. The moving unit 155 moves the printhead 154. The head control unit 153 controls the operations of the moving unit 155 and the printhead 154. The conveying unit 156 conveys the recording medium 157. The ink color/discharge amount selection unit 152 selects an ink color and discharge amount from the ink colors available in the printhead 154 and the ink discharge amounts that can be discharged by the printhead, based on the output values of print data read out from the image storage memory 151.

The image forming apparatus 100 and the printer 150 are connected by a printer interface or a network interface. The various functions of the image forming apparatus 100 mentioned earlier can be implemented by the printer 150, and the image forming apparatus 100 and the printer 150 may be integrated as a single apparatus.

FIG. 2 is a block diagram illustrating an exemplary configuration of the image forming apparatus 100. Note that FIG. 2 illustrates the minimum configuration required to realize the configuration of the image forming apparatus 100 according to the embodiments of the present invention, and other mechanisms belonging to the image forming apparatus 100 have been omitted in order to simplify the descriptions.

A CPU 201, which is a microprocessor, controls the image forming apparatus 100 based on programs and data stored in a ROM 203, a hard disk (HD) 212, and a storage medium set in an external memory drive 211.

A RAM 202 functions as a work area for the CPU 201, and holds programs stored in the ROM 203, the HD 212, and so on. The RAM 202 also serves as the roles of the image buffer 102, the image storage memory 107, and the accumulated error line buffer, which shall be described later.

Programs and the like executed by the CPU 201, which are illustrated later in flowcharts, are stored in the ROM 203, a storage medium set in the external memory drive 211, or the HD 212. The color separation LUT 104 is also stored in the ROM 203.

205 is a keyboard controller (KBC), which controls inputs from a keyboard (KB) 209, a pointing device such as a mouse (not shown), or the like. 206 is a display controller (DPC), which controls the display of a monitor 210. 207 is a disk controller (DKC), which controls access to the HD 212 and the external memory drive 211, and reads/writes various programs as well as various types of data, such as font data, user files, editing files, and so on, into those storage media. 208 is a printer controller (PRTC), which is connected to the printer 150 via a predetermined two-way interface 221, and controls the communication with the printer 150.

Note that the CPU 201 executes a process for rasterizing outline fonts in, for example, a display information region allocated in the RAM 202 or in a dedicated video memory (VRAM), thus enabling the fonts to be displayed in the monitor 210. In addition, the CPU 201 opens various registered windows and executes various data processes based on commands specified in the monitor 210 using a mouse cursor or the like.

Figure 3:
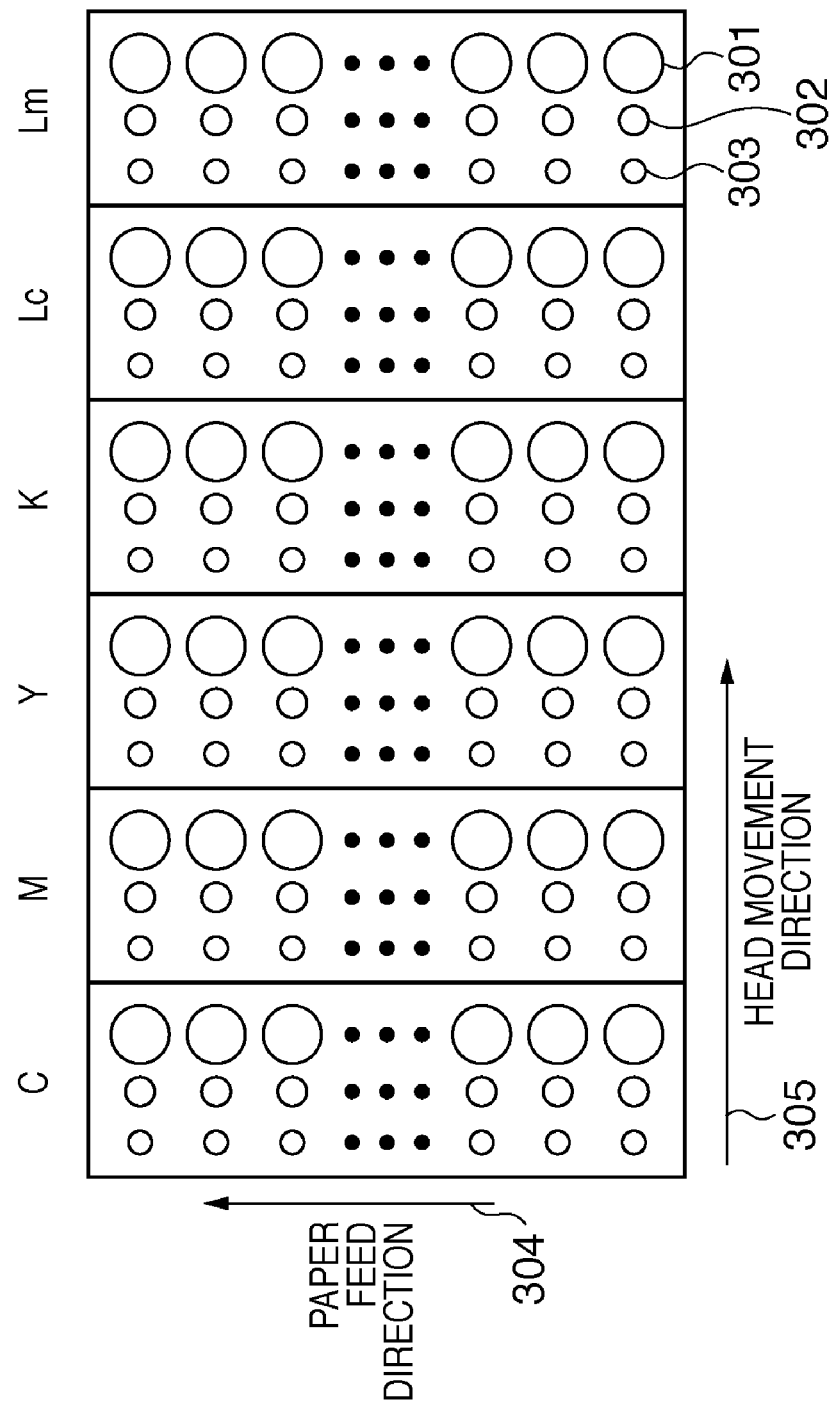
FIG. 3 is a diagram illustrating an example of the configuration of a printhead 154 according to the first embodiment.

FIG. 3 is a diagram illustrating an example of the configuration of the printhead 154. In the present embodiment, the printhead 154 is provided with six colors of ink, including light cyan (Lc) and light magenta (Lm), whose ink densities are relatively lighter, in addition to the four colors of cyan (C), magenta (M), yellow (Y), and black (K). The printhead 154 further includes large dot discharge nozzles 301, medium dot discharge nozzles 302, and small dot discharge nozzles 303, whose respective ink discharge amounts differ. The printhead 154 is thus capable of forming three types of dots whose discharge amounts differ for each of the six colors of ink.

Although the present embodiment describes a printhead 154 having a configuration in which the same type of nozzle is arranged in a row in the paper feed direction 304, it should be noted that this is merely to simplify the descriptions, and the number of nozzles and arrangement thereof is not limited to the example illustrated in the present embodiment. For example, there may be multiple rows of nozzles for each discharge amount, and the nozzles may be arranged in a zigzag pattern. In addition, although the order in which the ink colors are arranged is a row in the movement direction 305, a configuration in which the ink colors are arranged in a row in the paper feed direction 304.

Next, the effects of using dark/light dots and small/medium/large dots shall be briefly described. By using dark/light dots, it is possible for a printer that uses printed and non-printed dots so that the data gradually changes from one color to another to form images using a combination of multiple inks with differing densities. As a result, the number of tones that can be expressed increases, thus realizing rich tone reproducibility. Furthermore, by using small/medium/large dots, small dots can be used to form images in highlight regions, where visible graininess is problematic. The graininess significantly decreases as a result. On the other hand, medium and large dots can be used to form images in shadow regions. As a result, a sufficient density can also be ensured. The combination of small/medium/large dots is thus effective in achieving simultaneous image-quality enhancement in both highlight and shadow regions.

Figure 4:
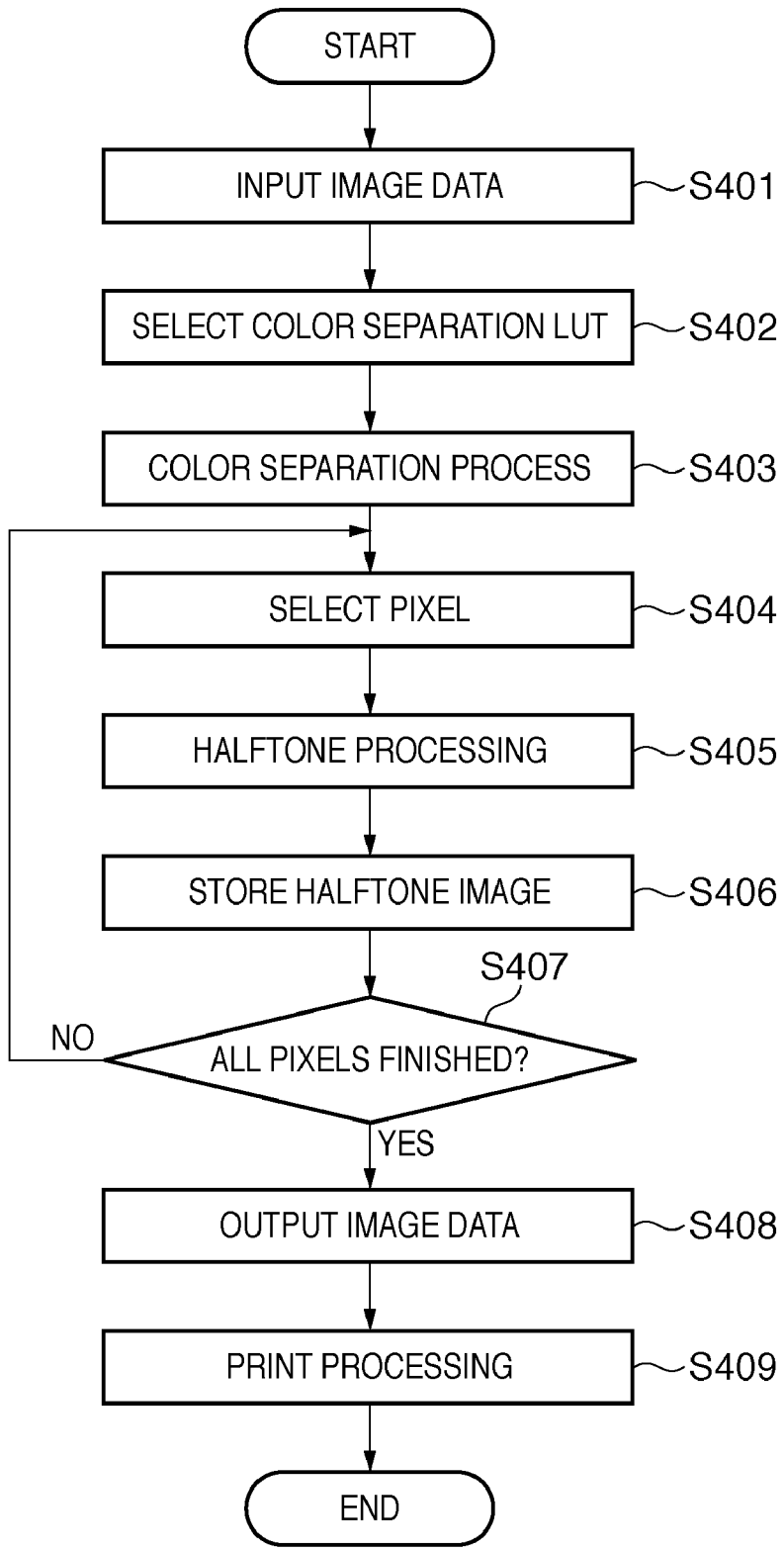
FIG. 4 is a flowchart illustrating an example of the overall operations of the image forming apparatus 100 according to the first embodiment.

Next, operations of the image forming apparatus 100 shall be described based on the flowchart in FIG. 4. FIG. 4 is a flowchart illustrating the overall operations of the image forming apparatus 100. This flowchart is processed by the CPU 201 executing a computer program written into the ROM 203.

In step S401, the image forming apparatus 100 stores, in the image buffer 102, multi-valued color input image data input into the input terminal 101. Note that the input image data is expressed by the three color components red (R), green (G), and blue (B).

In step S402, the color separation LUT selection unit 105 selects a single LUT from the multiple LUTs held in the color separation LUT 104, based on input from the user. A window 500 shown in FIG. 5, for example, is used for the input from the user.

Figure 5:
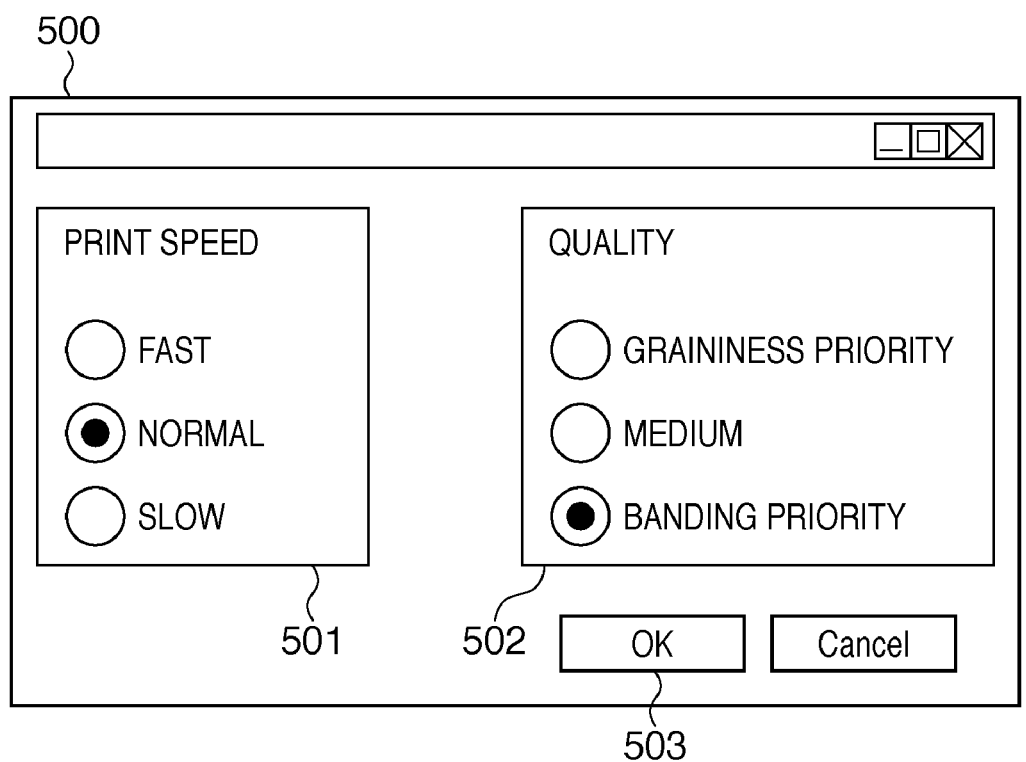
FIG. 5 is an example of a window 500 used by a user to select an LUT, according to the first embodiment.

FIG. 5 is an example of the window 500 used by a user to select an LUT. The user selects a single setting for each of print speed 501 and quality 502. Under quality 502, "graininess" refers to how rough the image is, and thus when "graininess priority" is selected, the printing is performed so that roughness in the image is suppressed as much as possible. Meanwhile, "banding" refers to the appearance of stripes in the image, and thus when "banding priority" is selected, the printing is performed so that the appearance of stripes is suppressed as much as possible. The user selects the stated two items and presses an OK button 503, thereby completing the LUT selection.

Figure 6:
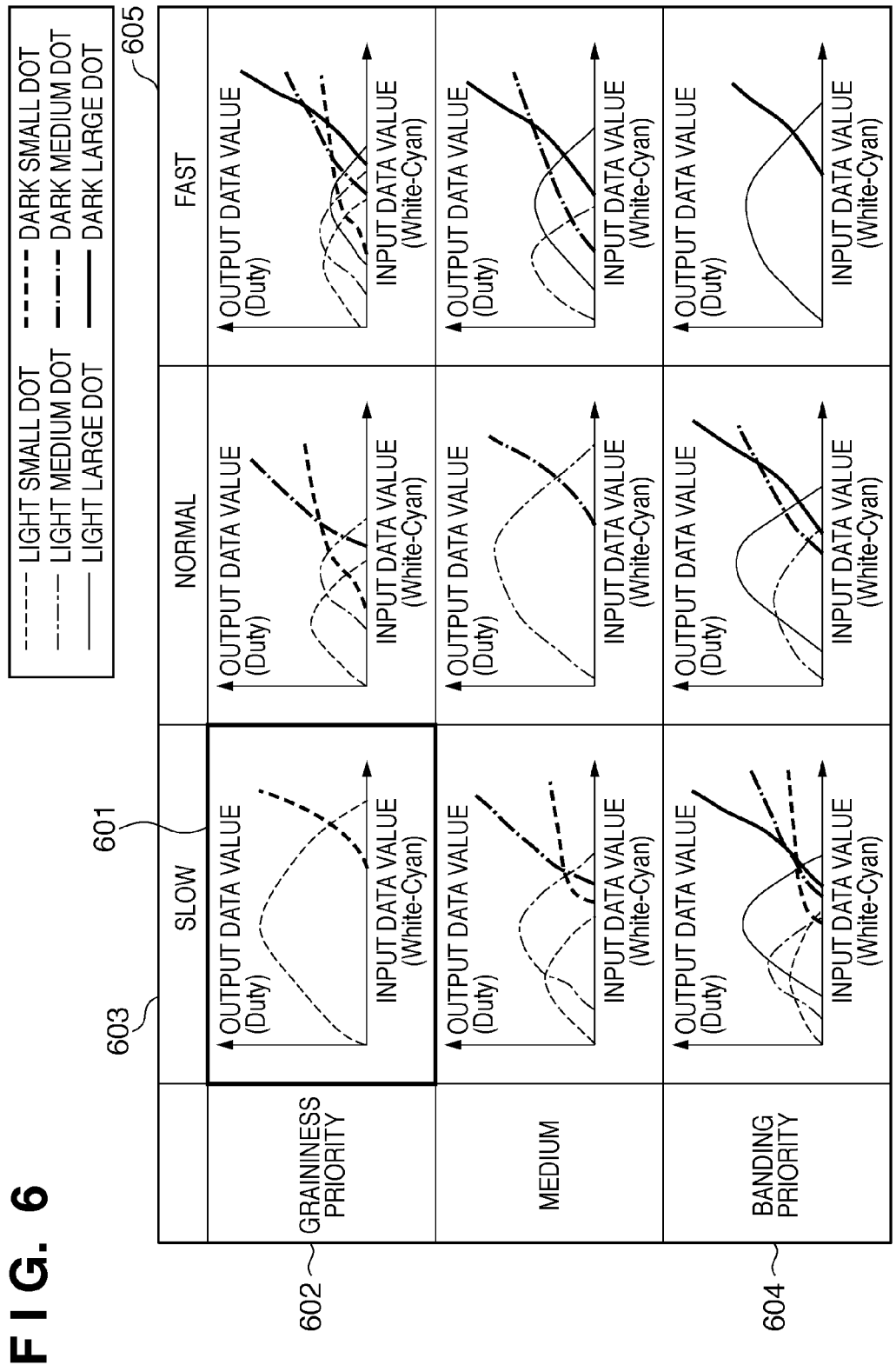
FIG. 6 is a diagram illustrating an example of the properties of an LUT according to the first embodiment.

Note that the LUT selected using the window 500 has properties such as those shown in FIG. 6. FIG. 6 is a diagram illustrating an example of LUT properties; for the sake of simplicity, only the properties for cyan ink are shown. A function that sets the ratio at which each dot is used is provided for each combination of settings selected by the user. For example, the graph 601 expresses the ratio of each dot used in the case where "graininess priority" 602 is set for the print speed 501 and "slow" 603 is set for the quality 502. When pixel values of image data have been input, the ratio at which each dot is used is output according to the functions expressed in the graph 601.

"Graininess priority" 602 sets small dots to be used extensively, whereas "banding priority" 604 sets large dots to be used extensively. This is because the use of small dots is effective in suppressing roughness in the image, whereas the use of large dots is effective in suppressing the appearance of stripes in the image. Furthermore, with "slow" 603, light dots are set to be used extensively, whereas with "fast" 605, dark dots are set to be used extensively. When slow printing is possible, more ink is absorbed by the paper, and thus light dots, which are advantageous in terms of image quality, can be used extensively. However, in the case where it is necessary to print at high speed, less ink is absorbed by the paper, and thus it is necessary to use dark dots in order to fill the paper using a small amount of ink.

Returning to FIG. 4, in step S403, the color separation processing unit 103 separates the multi-valued color input image data into planes using the LUT selected by the color separation LUT selection unit 105. A "plane" is a combination each ink color and each dot size. Through the plane separation process, the R, G, and B components are separated into C, M, Y, K, Lc, and Lm ink color planes and small/medium/large dots of differing discharge amounts.

In the present embodiment, each of the six colors of ink has three types of dots, or small/medium/large, and thus the RGB color input image data is converted into image data with a total of 18 planes, obtained by combining each of the C, M, Y, K, Lc, and Lm planes with each of the small/medium/large dot sizes. Details of the color separation process shall be given later.

In step S404, the halftone processing unit 106 selects a single pixel upon which to perform halftone processing from the unprocessed pixels.

In step S405, the halftone processing unit 106 performs halftone processing for making a conversion to a lower number of tones. In the present embodiment, print data with 2-bit tone values is obtained by performing the halftone processing on input image data whose pixels have 8-bit tone values.

The error diffusion method according to R. Floyd et al. exists as a method for converting the input image data into image data that has a reduced number of tone values, like the print data. The present embodiment also uses halftone processing based on the error diffusion method. Details of the halftone processing shall be given later.

In step S406, the halftone processing unit 106 stores the print data that has undergone the halftone processing in the image storage memory 107.

Figure 7:
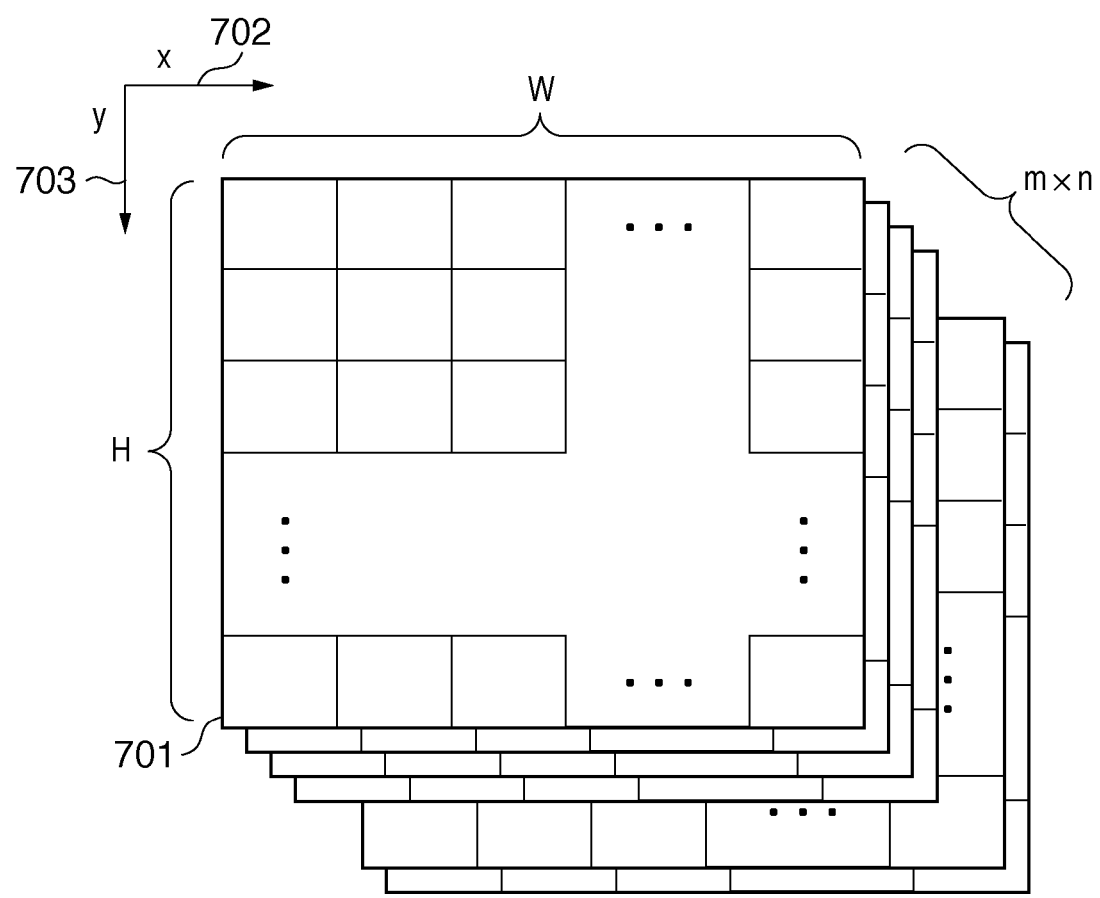
FIG. 7 is a diagram illustrating, in detail, an example of the configuration of an image storage memory according to the first embodiment.

FIG. 7 is a diagram illustrating, in detail, an example of the configuration of the image storage memory 107. When m is taken as the number of planes following the color separation process, and n is taken as the number of passes in the multi-pass recording, the input image data is separated into m×n pieces of image data 701. When the number of pixels in the x-axis direction 702 and the y-axis direction 703 of the image data are taken as W and H respectively, a single piece of image data contains W×H pixels. The x-axis direction 702 and the y-axis direction 703 correspond to the head movement direction 305 and the paper feed direction 304 shown in FIG. 3, respectively. Therefore, the storage region of the image storage memory 107 is represented as O(x, y, j, k) ($0 \leq x \leq W$, $0 \leq y \leq H$, $0 \leq j \leq m$, $0 \leq k \leq n$). In the present embodiment, print data is calculated by sequentially inputting pixels corresponding to each plane, and the print data is then printed. Accordingly, a memory space sufficient to hold all of the image data 701 does not need to be prepared in the image buffer 102. Similarly, with the image storage memory 107, it is only necessary to prepare the memory space needed for, for example, recording operations on the band level.

Returning once again to FIG. 4, in step S407, it is determined whether or not all the pixels have been processed. In the case where not all the pixels have been processed ("NO" in step S407), the process returns to step S404, and the next pixel is selected. However, in the case where all the pixels have been processed ("YES" in step S407), the process moves to step S408.

In step S408, the image forming apparatus 100 transfers the print data that has undergone the halftone processing from the output terminal 108 to the printer 150. The print data is output at an arbitrary size equivalent to the entire image or the band width of a recording region unit.

In step S409, the printer 150 stores the input print data in the image storage memory 151. Furthermore, the printer 150 selects the ink color and discharge amount that conforms to the print data, and commences image formation. The image formation is performed by the printhead 154 driving each nozzle at a constant driving interval while moving from left to right relative to the recording medium 157, thereby recording an image thereupon. Note that in the present embodiment, the multi-pass recording method, in which the printhead 154 makes multiple scans on the recording medium 157 in order to complete the image, is used. Details of the multi-pass recording method shall be given later. In this manner, the series of processes that make up the image formation process performed on multi-valued color input image data are completed.

Figure 8:
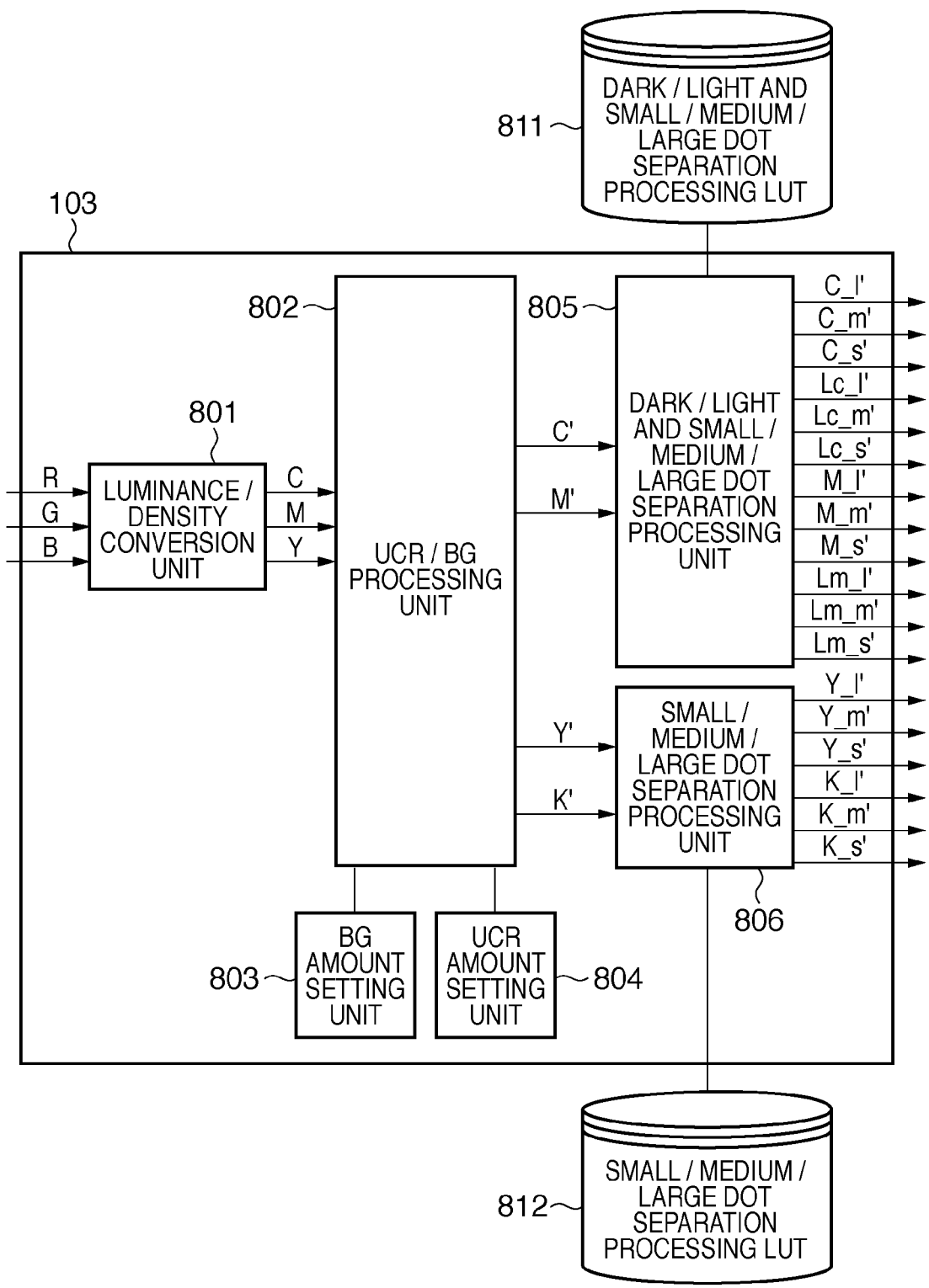
FIG. 8 is a diagram illustrating, in detail, an example of the configurations of a color separation processing unit 103 and a color separation LUT 104 of the image forming apparatus 100 according to the first embodiment.

Next, the color separation process performed in step S403 of FIG. 4 shall be described in detail using FIG. 8. FIG. 8 is a diagram illustrating, in detail, an example of the configurations of the color separation processing unit 103 and the color separation LUT 104 of the image forming apparatus 100. The color separation processing unit 103 includes a luminance/density conversion unit 801, a UCR/BG processing unit 802, a BG amount setting unit 803, a UCR amount setting unit 804, a dark/light and small/medium/large dot separation processing unit 805, and a small/medium/large dot separation processing unit 806. Meanwhile, the color separation LUT 104 includes a dark/light and small/medium/large dot separation processing LUT 811 and a small/medium/large dot separation processing LUT 812.

The luminance/density conversion unit 801 converts the input image data from the R, G, B system into a C, M, Y system based on the following equations (1) to (3).

$$C(x, y) = -\alpha \log(R(x, y)/255) \quad (1)$$

$$M(x, y) = -\alpha \log(G(x, y)/255) \quad (2)$$

$$Y(x, y) = -\alpha \log(B(x, y)/255) \quad (3)$$

Here, $\alpha$ is a predetermined constant. In addition, C(x, y) is a pixel value of C for the pixel (x, y) in the input image data; the same applies for other colors as well.

Next, the UCR/BG processing unit 802 converts the image data from the C, M, Y system into a C', M', Y', K' system based on the following equations (4) to (7).

$$C'(x, y) = C(x, y) - (\mu/100) \times \rho \quad (4)$$

$$M'(x, y) = M(x, y) - (\mu/100) \times \rho \quad (5)$$

$$Y'(x, y) = Y(x, y) - (\mu/100) \times \rho \quad (6)$$

$$K'(x, y) = \beta(\rho, \mu) \times (\mu/100) \times \rho \quad (7)$$

(Where $\rho = \min(C(x, y), M(x, y), Y(x, y))$.)

Here, $\beta(\rho, \mu)$ is a real number that fluctuates depending on $\rho$ and $\mu$, and is set by the BG amount setting unit 803. The amount of black ink used is set by this value. $\mu$, meanwhile, is a constant set by the UCR amount setting unit 804.

Next, the dark/light and small/medium/large dot separation processing unit 805 executes dark/light ink separation and small/medium/large dot separation for C' and M', which include two types of ink densities, by referring to the dark/light and small/medium/large dot separation processing LUT 811. For C', the separation is performed based on the following equations (8) to (13).

$$C\_l'(x, y) = C\_l(C'(x, y)) \quad (8)$$

$$C\_m'(x, y) = C\_m(C'(x, y)) \quad (9)$$

$$C\_s'(x, y) = C\_s(C'(x, y)) \quad (10)$$

$$Lc\_l'(x, y) = Lc\_l(C'(x, y)) \quad (11)$$

$$Lc\_m'(x, y) = Lc\_m(C'(x, y)) \quad (12)$$

$$Lc\_s'(x, y) = Lc\_s(C'(x, y)) \quad (13)$$

Here, the left sides of the equations (8) to (13) respectively represent the pixel values of a cyan large dot, a cyan medium dot, a cyan small dot, a light cyan large dot, a light cyan medium dot, and a light cyan small dot, following the dark/light and small/medium/large dot separation. The functions defined in the right sides of the equations (8) to (13) correspond to the dark/light and small/medium/large dot separation processing LUT. These functions are defined in, for example, the graph 601 illustrated in FIG. 6. The same applies for magenta, and thus descriptions thereof shall be omitted.

Meanwhile, because the two colors Y' and K' are not provided with light ink, the small/medium/large dot separation processing unit 806 executes the small/medium/large dot separation process by referring to the small/medium/large dot separation processing LUT 812. For Y', the separation is performed based on the equations (14) to (16).

$$Y\_l'(x, y) = Y\_l(Y(x, y)) \quad (14)$$

$$Y\_m'(x, y) = Y\_m(Y(x, y)) \quad (15)$$

$$Y\_s'(x, y) = Y\_s(Y(x, y)) \quad (16)$$

Here, the left sides of the equations (14) to (16) respectively represent the pixel values of a yellow large dot, a yellow medium dot, and a yellow small dot, following the small/medium/large dot separation process. The same applies for black, and thus descriptions thereof shall be omitted. The color separation process is completed through the processing described thus far.

Next, the halftone processing of step S405 shown in FIG. 4 shall be described.

A process for converting the input image data into print data and a process for calculating the print data to be printed in each pass are performed in the halftone processing of the present embodiment. The print data printed in a particular pass is called "pass print data", and more specifically, the pass print data printed in the kth pass is called "kth pass print data". Furthermore, the print data obtained from converting the input image data is called "total print data". In the halftone processing, each instance of pass print data is calculated so that the result of printing all instances of pass print data is equivalent to the total print data.

The halftone processing unit 106 calculates total input data I, used in the processing for calculating the total print data, and kth pass input data $I_k$, used in the processing for calculating the kth pass print data (where k=1, 2, and so on up to n−1). Because nth pass print data is determined based on print data from the (n−1)th pass or below and the total print data, there is no need to calculate nth pass input data.

The halftone processing is carried out on a plane-by-plane basis. In the case of a cyan large dot plane, the pixel value $C\_l'(x, y)$ of the image data calculated earlier is used as the pixel value $I(x, y)$ for the pixel $(x, y)$ in the total input data I. Furthermore, the pixel value $I_k(x, y)$ for the pixel $(x, y)$ in the kth pass input data $I_k$ is calculated through the following equation (17).

$$I_k(x, y) = f\_C\_l'(C\_l'(x, y), k) \quad (17)$$

Here, f_C_l' is a function for calculating the kth pass input data, using the pixel value $C\_l'(x, y)$ of the image data and k as arguments. In the present embodiment, $I_k(x, y)$ is calculated by multiplying the inverse of the number of passes, using the following equation (18).

$$I_k(x, y) = \mathrm{ROUND}(C\_l'(x, y)/n) \quad (18)$$

Here, n represents the number of passes. Furthermore, because $C\_l'(x, y)/n$ takes on a real number value of 0 to 255, rounding off $C\_l'(x, y)/n$ using the ROUND function gives $I_k(x, y)$ an integer value of 0 to 255.

Figure 21:
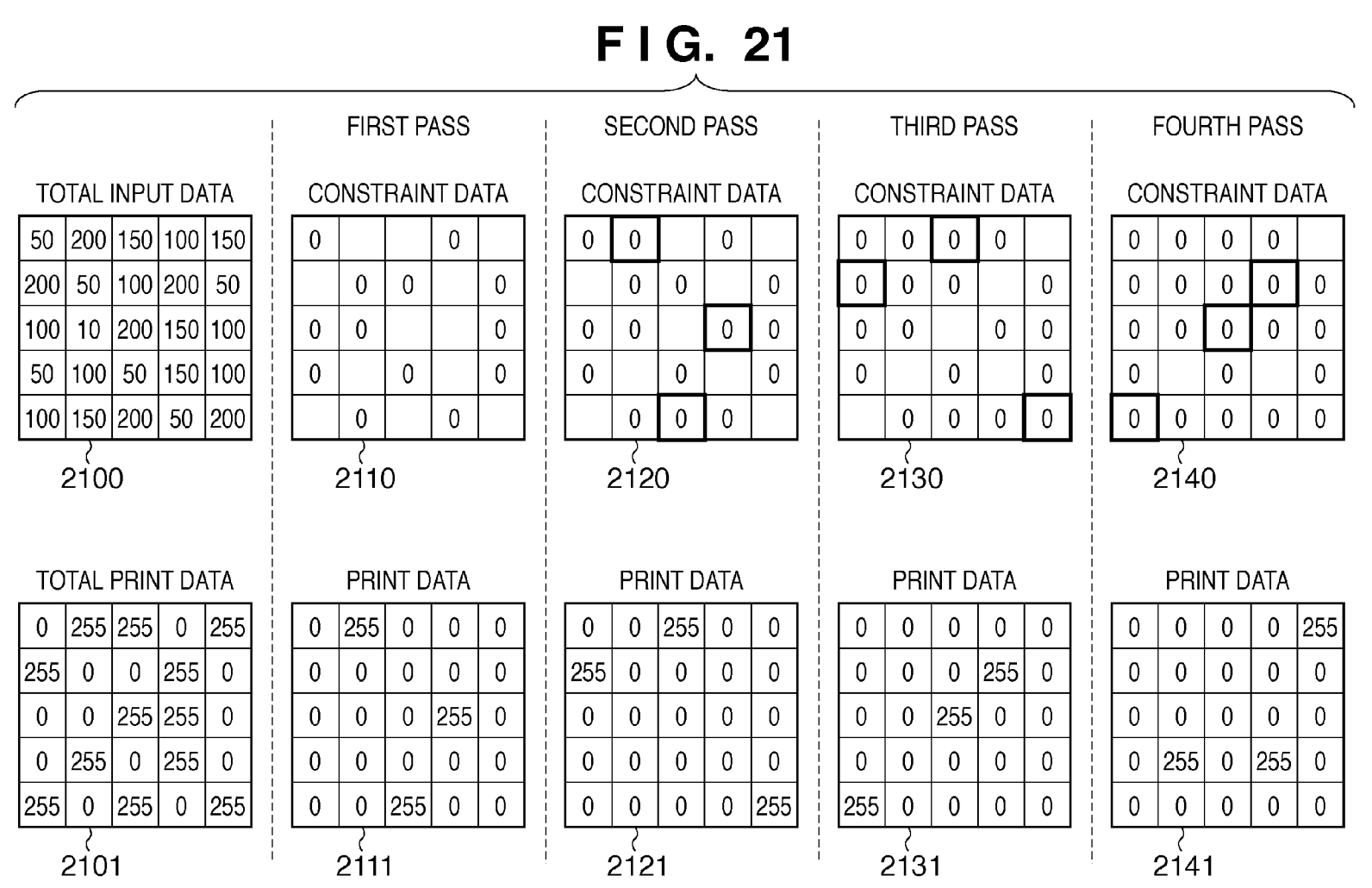
Figure 22:
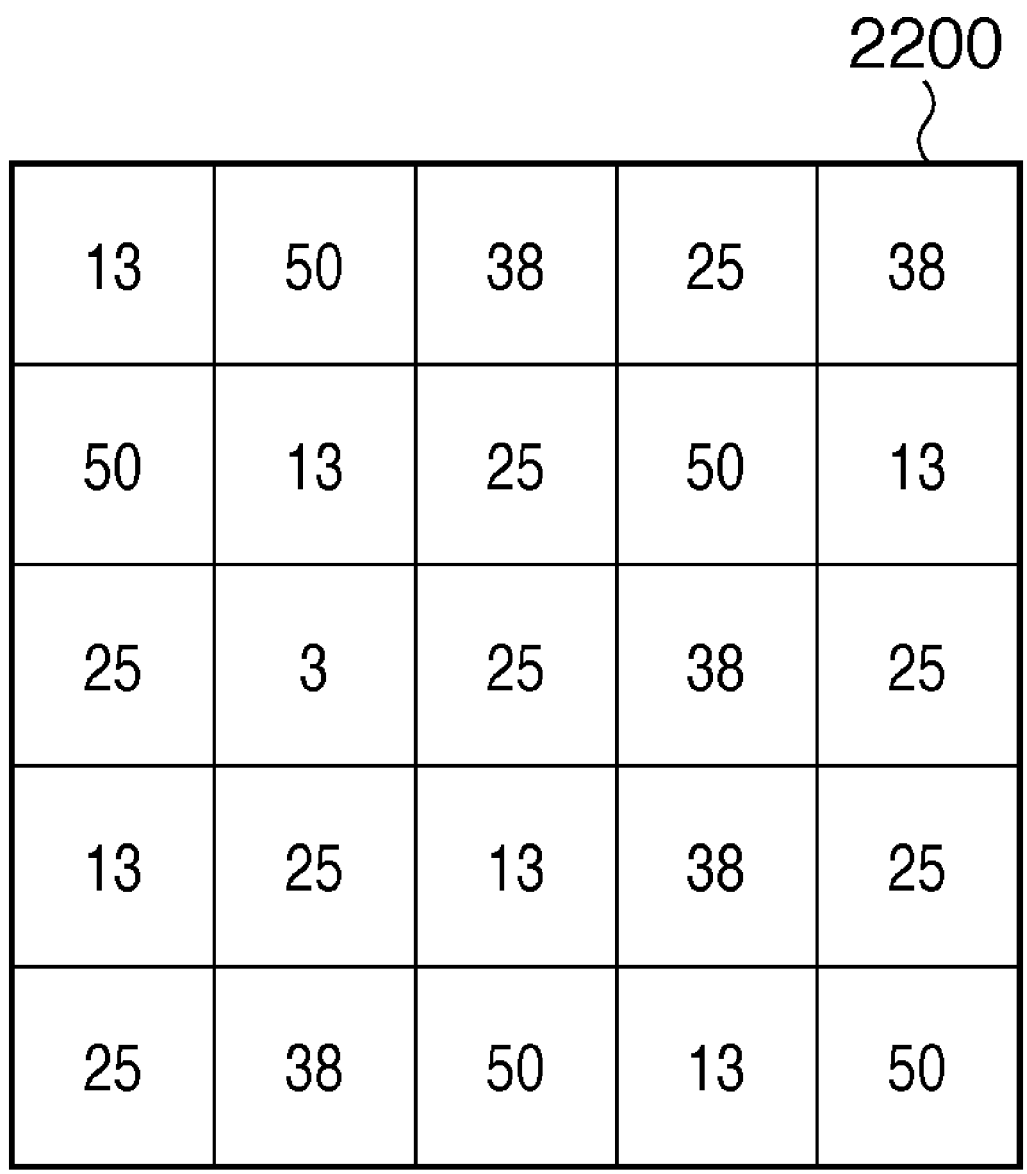
FIG. 22 is an example of input data 2200 in each pass according to the first embodiment.

An outline of the halftone processing shall be described using FIGS. 21 and 22. FIG. 21 is a diagram illustrating an example of the progress of constraints given to each pass and the print data. A case where four-pass printing is performed, in which the total input data 2100 is divided into four passes, shall be described. FIG. 22 is an example of input data 2200 in each pass. Applying the above equation (18) to the pixel values in the total input data 2100 results in the input data 2200 in each pass.

First, the halftone processing is carried out on the total input data 2100, thereby calculating total print data 2101. In the present embodiment, the error diffusion method is used in this halftone processing. A first conversion is performed, resulting in the total print data 2101, which is first print data; in this data, pixels with a pixel value of 255 are pixels for which dots are ultimately discharged. At this stage, in which of the four scans that are to be carried out dots will be discharged is not set, but it is certain that dots will be discharged in one of the scans. Meanwhile, it is also certain that pixels with a pixel value of 0 in the total print data 2101 will not have a dot discharged in any of the scans.

In the processing of the first pass, first pass constraint data 2110 is set based on the total print data 2101, and a second conversion is performed through error diffusion based on this constraint data, thereby calculating first pass print data 2111, which is second print data. "Constraint data" refers to data that specifies pixels that are to have pixel values of 0 in the print data for each pass. The first pass print data 2111 is also used as a constraint for the error diffusion in the subsequent passes, described later.

Pixels in the total print data 2101 with a pixel value of 0 should also have a pixel value of 0 in the first pass print data 2111. Accordingly, pixels in the total print data 2101 with a pixel value of 0 are specified to have a constraint value of 0 in the first pass constraint data 2110. Pixels in the total print data 2101 with a pixel value of 255 may also have a pixel value of 255 in the first pass print data 2111 or in the print data of subsequent passes, and thus a constraint is not specified therefor.

Next, in the processing of the second pass, second pass constraint data 2120 is set based on the total print data 2101 and the first pass print data 2111, and second pass print data 2121 is calculated through error diffusion based on this constraint data. Pixels in the total print data 2101 with a pixel value of 0 should also have a pixel value of 0 in the second pass print data 2121. Furthermore, pixels that have a pixel value of 255 in the first pass print data 2111, processed earlier, do not need to be printed in the second pass. Accordingly, a constraint that applies a constraint value of 0 to pixels in the first pass print data 2111 with a pixel value of 255 is added to the first pass constraint data 2110. Second pass constraint data 2120 is obtained as a result. Elements enclosed in a bolded frame are elements to which a constraint has been newly added by the second pass constraint data 2120.

Similarly, during the processing of the third pass, third pass constraint data 2130 is determined based on the total print data 2101, the first pass print data 2111, and the second pass print data 2121. Third pass print data 2131 is calculated as a result of the error diffusion.

Next, in the processing of the fourth pass, fourth pass constraint data 2140 is determined based on the total print data 2101 and the first through third pass print data, without performing error diffusion. As described earlier, elements for which a constraint is not specified in the fourth pass constraint data 2140 that has been created are pixels for which dots should be discharged but for which dots have not been discharged in any of the passes thus far. Accordingly, fourth pass print data 2141, which specifies the pixel value of pixels for which a constraint is not specified as 255, is determined. Through the above processing the print data can be calculated for each pass based on the total input data 2100.

Next, details of halftone processing for the case where n=2, or in other words, when two-pass printing is performed, shall be described using FIGS. 9 to 12.

Figure 9:
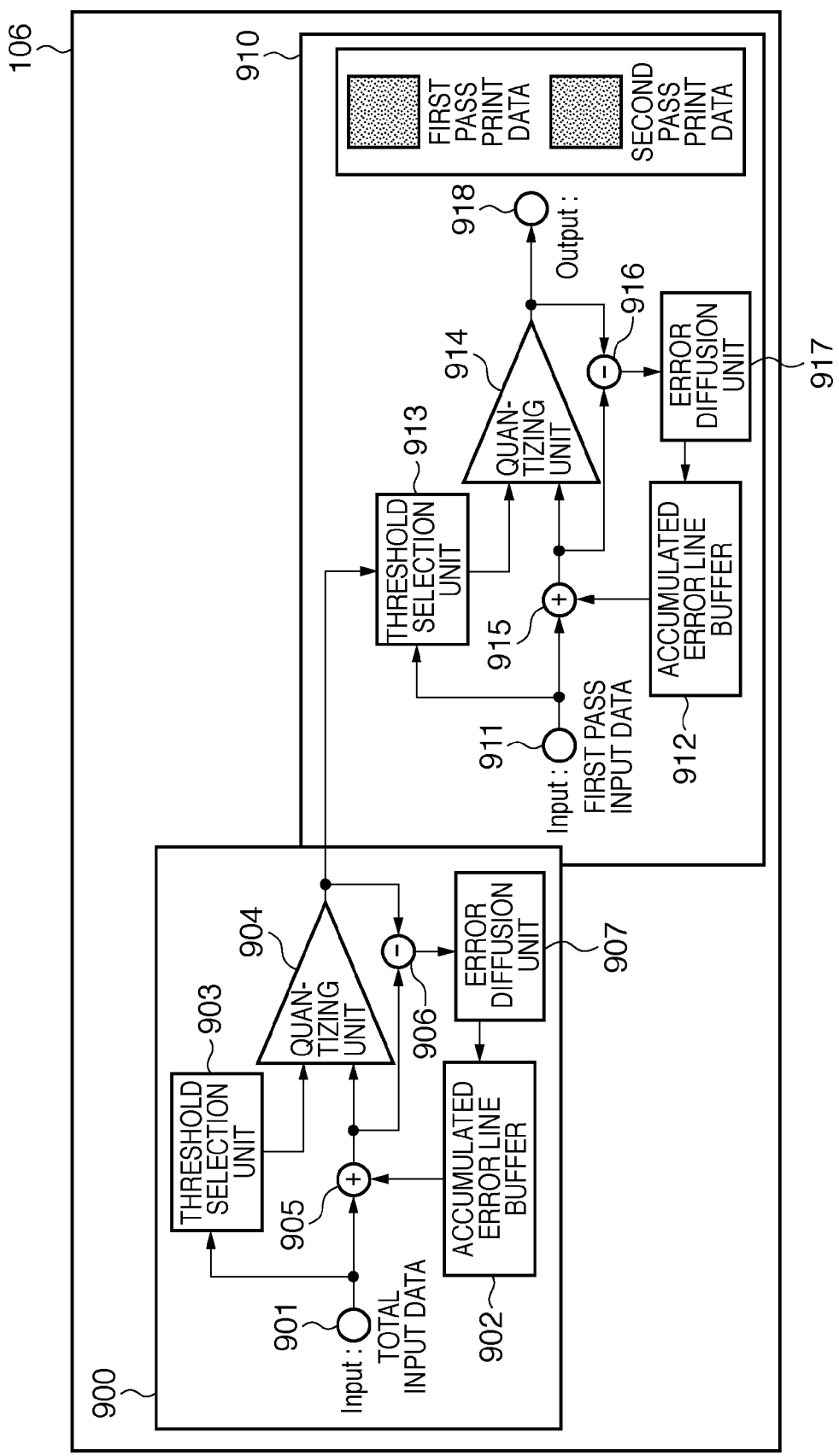
FIG. 9 is a block diagram illustrating an example of the functional configuration of a halftone processing unit 106 when performing two-pass printing, according to the first embodiment.

FIG. 9 is a block diagram illustrating an example of the functional configuration of the halftone processing unit 106 when performing two-pass printing. The elements illustrated in FIG. 9 may be entirely implemented using hardware, or part or all of the elements may be implemented using software.

The halftone processing unit 106 includes a binarization unit 900 that processes the total input data and a binarization unit 910 that processes the first pass input data. The binarization unit 900 performs a process for calculating the total print data. The binarization unit 910, meanwhile, performs a process for calculating the first pass print data and the second pass print data.

The halftone processing is performed by sequentially executing the processing on each pixel in the input data. In the present embodiment, the x-axis direction is taken as the main scanning direction, and the y-axis direction is taken as the sub scanning direction, starting with the top-left pixel of the image data.

The binarization unit 900 includes an accumulated error line buffer 902, a threshold selection unit 903, a quantizing unit 904, and an error diffusion unit 907.

The accumulated error line buffer 902 stores the accumulated error that occurs in the error diffusion method. With the error diffusion method, print data having natural tonal expression can be obtained by applying the error that occurs in a pixel of interest due to the halftone processing to the pixel values of the peripheral pixels.

Figure 10A:
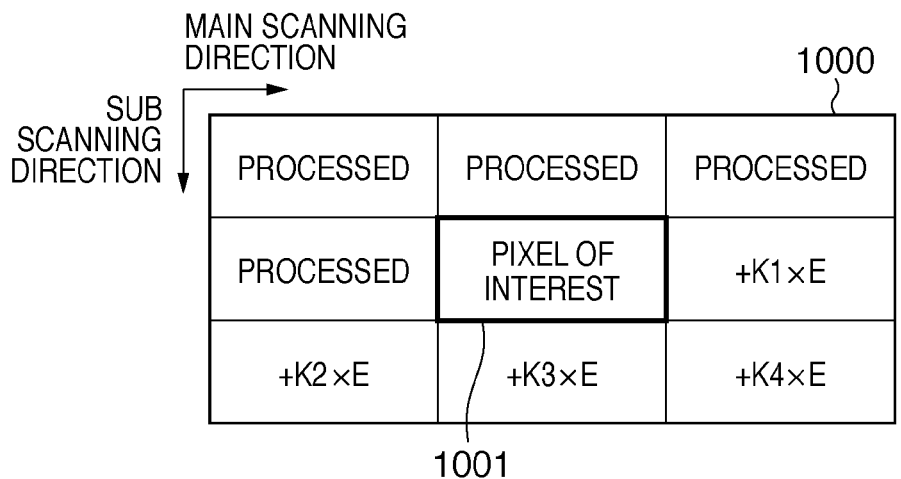
FIGS. 10A to 10C are diagrams illustrating an example of a rule for diffusing error according to the first embodiment.
Figure 10B:
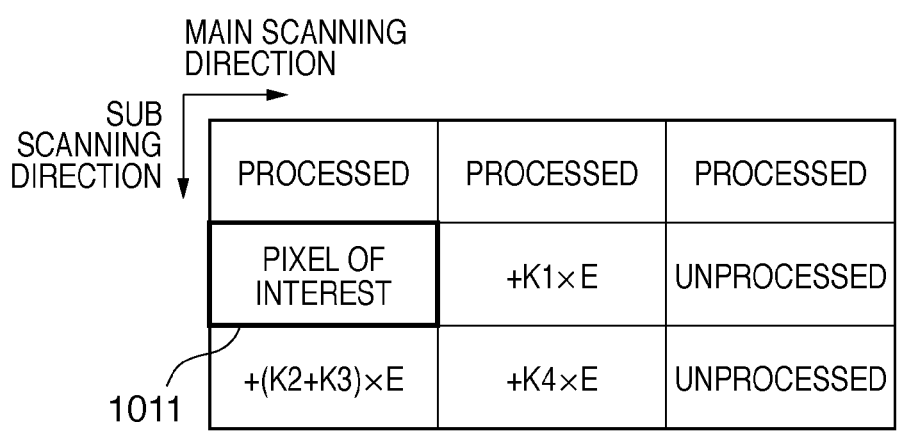
Figure 10C:
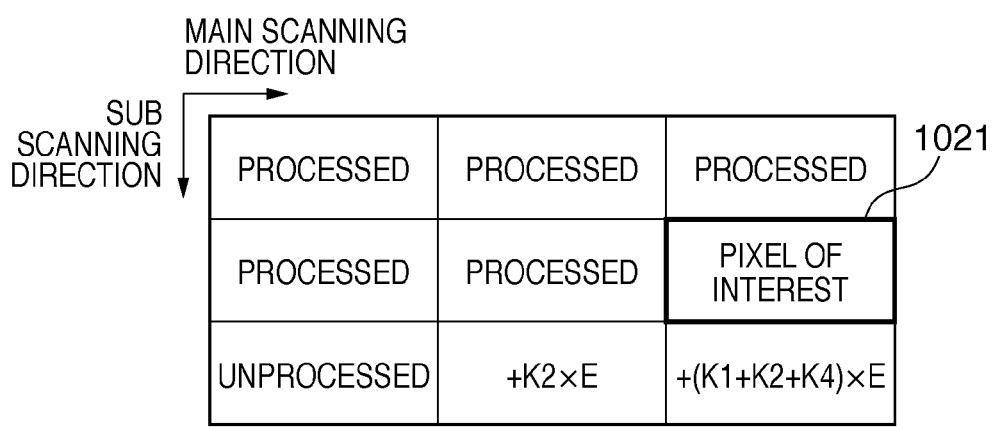

FIGS. 10A to 10C are diagrams illustrating an example of a rule for diffusing error. Image data 1000 in FIG. 10A depicts data that focuses upon the periphery of a pixel of interest 1001 in input data. The error E that occurs in the pixel of interest 1001 is multiplied by error diffusion coefficients $K_1$ to $K_4$, and the resultant is added to the pixel values of the surrounding pixels. In an example, the error diffusion coefficients are defined so that the total value is 1, and thus, for example, $K_1 = 7/16$, $K_2 = 3/16$, $K_3 = 5/16$, and $K_4 = 1/16$.

In the case where a pixel of interest 1011 is located on the left side of the image data, as shown in FIG. 10B, the error E is diffused in the manner shown in FIG. 10B. On the other hand, in the case where a pixel of interest 1021 is located on the right side of the image data, as shown in FIG. 10C, the error E is diffused in the manner shown in FIG. 10C.

Figure 11:
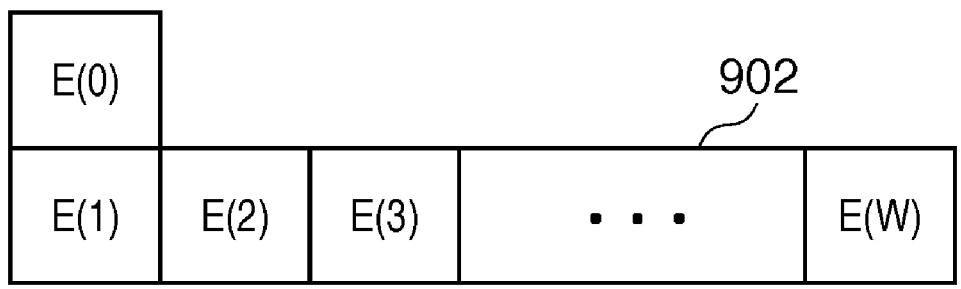
FIG. 11 is an example of the configuration of an accumulated error line buffer 902 according to the first embodiment.

The accumulated error line buffer 902, used for storing the error that has occurred, is configured, for example, as shown in FIG. 11. FIG. 11 is an example of the configuration of the accumulated error line buffer 902. As shown in FIG. 11, the accumulated error line buffer 902 includes storage regions E(x) (where X=0, 1, and so on up to W). W is the number of pixels in the main scanning direction. E(x) (where x=1, 2, and so on up to W) stores the error added when processing the pixel (x, y). E(0) temporarily stores the value that should be applied to the pixel to the bottom-right of the pixel of interest. Note that the accumulated error line buffer 902 may have all its values initialized to 0 prior to the start of processing, or may be initialized using random values. When using random values, the total value may be approximately 0.

Descriptions shall now be resumed from FIG. 9. The error diffusion unit 907 performs a process for diffusing the error E by processing the following equations (19) to (25) in sequence.

$$E(x+1) \leftarrow E(x+1) + E \times K_1 \text{ (when x<W)} \quad (19)$$

$$E(x-1) \leftarrow E(x-1) + E \times K_2 \text{ (when x>1)} \quad (20)$$

$$E(x) \leftarrow E(0) + E \times K_3 \text{ (when 1<x<W)} \quad (21)$$

$$E(x) \leftarrow E(0) + E \times (K_2 + K_3) \text{ (when x=1)} \quad (22)$$

$$E(x) \leftarrow E(0) + E \times (K_1 + K_3 + K_4) \text{ (when x=W)} \quad (23)$$

$$E(0) \leftarrow E \times K_4 \text{ (when x<W)} \quad (24)$$

$$E(0) \leftarrow 0 \text{ (when x=W)} \quad (25)$$

From equation (21) to equation (23), the temporarily-stored E(0) is added to the accumulated error E(x). In addition, equation (25) is for the case where the pixel of interest is located on the right side of the image data, and because error cannot be diffused to the bottom-right pixel, the value of E(0) is 0.

The threshold selection unit 903 sets a threshold T(I(x, y)) used during the halftone processing. In the present embodiment, the range of pixel values for the total input data is $0 \leq I(x, y) \leq 255$, and thus the threshold is set as follows.

$$T(I(x, y)) = 128 \quad (26)$$

T(I(x, y)) may be finely adjusted based on the total input data I(x, y) so as to reduce the average quantization error, in order to avoid delay in the generation of dots.

The quantizing unit 904 calculates the pixel values of the print data based on the threshold T(I(x, y)) and the pixel values I'(x, y) following the error addition. Here, the pixel values I'(x, y) following the error addition are provided by the following equation (27) using the pixel values I(x, y) of the total image data and the accumulated error E(x).

$$I'(x, y) = I(x, y) + E(x) \quad (27)$$

The quantizing unit 904 calculates the pixel values B(x, y) of the total print data through the following equations (28) and (29).

When I'(x, y)<128, $$B(x, y) = 0 \quad (28)$$

When I'(x, y)≥128, $$B(x, y) = 255 \quad (29)$$

The pixels (x, y) for which B(x, y)=255 are printed as dots in the formed image. In other words, these are pixels for which a dot is printed in either the first or second pass. However, the pixels (x, y) for which B(x, y)=0 are not printed as dots in the formed image. In other words, these are pixels for which a dot is not printed in either the first or second pass.

Next, the elements of the binarization unit 910 shall be described. An accumulated error line buffer 912 and an error diffusion unit 917 are identical to the accumulated error line buffer 902 and the error diffusion unit 907 respectively, and thus descriptions thereof shall be omitted.

A threshold selection unit 913 sets a threshold $T_1(I_1(x, y))$ used during the halftone processing. In the present embodiment, the range of pixel values for the first pass input data is $0 \leq I_1(x, y) \leq 127$, and thus the threshold is set as follows.

$$T_1(I_1(x, y))=64 \qquad (26)$$

Furthermore, the threshold selection unit 913 outputs the pixel values B(x, y) of the total print data, which are output from the quantizing unit 904, to a quantizing unit 914 along with the threshold.

The quantizing unit 914 calculates constraint data based on B(x, y). The pixel values $B_1(x, y)$ of the first pass print data are then calculated using this constraint data, $T_1(I_1(x, y))$, and $I'_1(x, y)$. Furthermore, the second pass print data $B_2(x, y)$ is calculated based on the pixel values B(x, y) of the total print data and the pixel values $B_1(x, y)$ of the first pass print data. Here, the pixel values $I'_1(x, y)$ following the error addition are provided by the following equation (27) using the pixel values $I_1(x, y)$ of the first pass input data and the accumulated error $E_1(x)$.

$$I'_1(x, y)=I_1(x, y)+E_1(x) \qquad (27)$$

Error diffusion using the constraint data is performed by processing the following equations (28) and (29).

When B(x, y)=255 and $I'_1(x, y) \geq 64$, $$B_1(x, y)=255 \qquad (28)$$

In all other cases, $$B_1(x, y)=0 \qquad (29)$$

In other words, a pixel that is a print pixel in the total print data and whose post-error addition pixel value is greater than or equal to the threshold is a print pixel in the first pass. However, a pixel that is a non-print pixel in the total print data or whose post-error addition pixel value is less than the threshold is a non-print pixel in the first pass.

The quantizing unit 914 calculates the pixel values $B_2(x, y)$ of the second pass print data through the following equations (30) and (31).

When B(x, y)=255 and $B_1(x, y)$=0, $$B_2(x, y)=255 \qquad (30)$$

In all other cases, $$B_2(x, y)=0 \qquad (31)$$

In other words, a pixel that is a print pixel in the total print data and became a non-print pixel in the first pass print data is a print pixel in the second pass print data. However, a pixel that is a non-print pixel in the total print data or became a print pixel in the first pass print data is a non-print pixel in the second pass print data.

Figure 12:
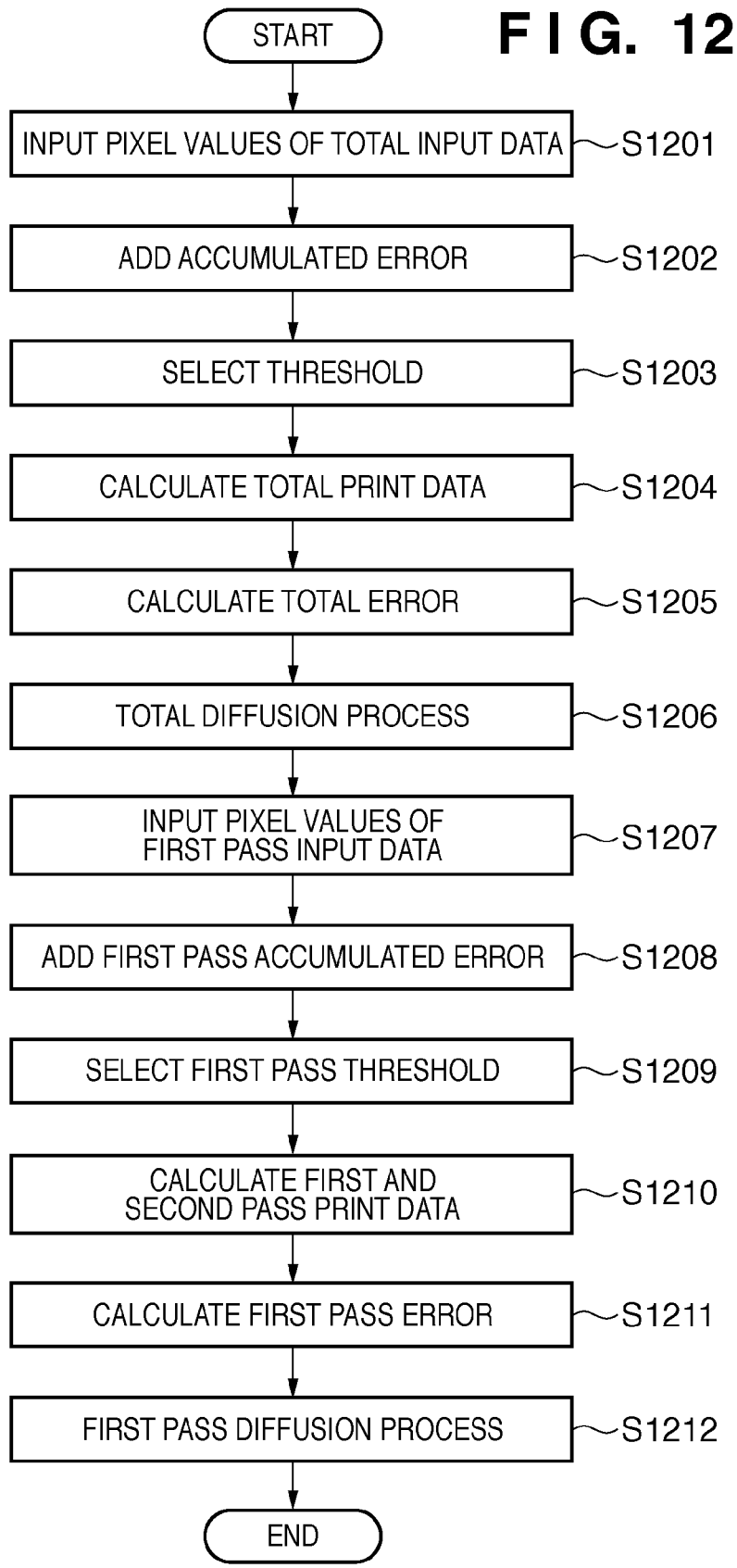
FIG. 12 is a flowchart illustrating an example of the operations of the halftone processing unit 106 according to the first embodiment.

Next, details of the process shown in FIG. 4 up until step S405 shall be described using the flowchart shown in FIG. 12. FIG. 12 is a flowchart illustrating an example of operations performed by the halftone processing unit 106. This flowchart is processed by the CPU 201 executing a computer program written into the ROM 203.

In step S1201, the halftone processing unit 106 inputs the pixel value I(x, y) in the total input data for a selected pixel (x, y) into the input terminal 901.

In step S1202, an accumulated error adding unit 905 reads out the error E(x) of a pixel of interest (x, y) from the accumulated error line buffer 902 and adds that value to the total input data I(x, y).

In step S1203, the threshold selection unit 903 selects the threshold T. Here, as described earlier, this threshold is 128.

In step S1204, the quantizing unit 904 calculates the total print data B(x, y), and outputs that data to the threshold selection unit 913 and an error computation unit 906.

In step S1205, the error computation unit 906 calculates the error E based on the following equation (32), and outputs the resultant to the error diffusion unit 907.

$$E=I'(x, y)-B(x, y) \qquad (32)$$

In step S1206, the error diffusion unit 907 updates the accumulated error line buffer 902 based on the error E.

The above completes the halftone processing performed on the selected pixel I(x, y) in the input image data. Continuing on, error diffusion is performed on the first pass input data $I_1(x, y)$, and the first pass print data and second pass print data are calculated.

In step S1207, the halftone processing unit 106 inputs the pixel value $I_1(x, y)$ in the first pass input data for the selected pixel (x, y) into an input terminal 911.

In step S1208, an accumulated error adding unit 915 reads out the error $E_1(x)$ of the pixel of interest (x, y) from the accumulated error line buffer 902 and adds that value to the first pass input data $I_1(x, y)$.

In step S1209, the threshold selection unit 913 selects the threshold $T_1$, and outputs the threshold to the quantizing unit 914 along with the output B(x, y) from the quantizing unit 904.

In step S1210, the quantizing unit 914 performs the aforementioned process, outputting the first pass print data $B_1(x, y)$ and the second pass print data $B_2(x, y)$ to an output terminal 918 and an error computation unit 916.

In step S1211, the error computation unit 916 calculates the error E based on the following equation (33), and outputs the resultant to the error diffusion unit 917.

$$E=I'_1(x, y)-B_1(x, y) \qquad (33)$$

In step S1212, the error diffusion unit 917 updates the accumulated error line buffer 912 based on the error E.

The above completes the halftone processing performed on the pixel value $I'_1(x, y)$ for the selected pixel I(x, y) in the first pass input data. At the same time, the pixel value $B_2(x, y)$ in the second pass print data is calculated.

Figure 13:
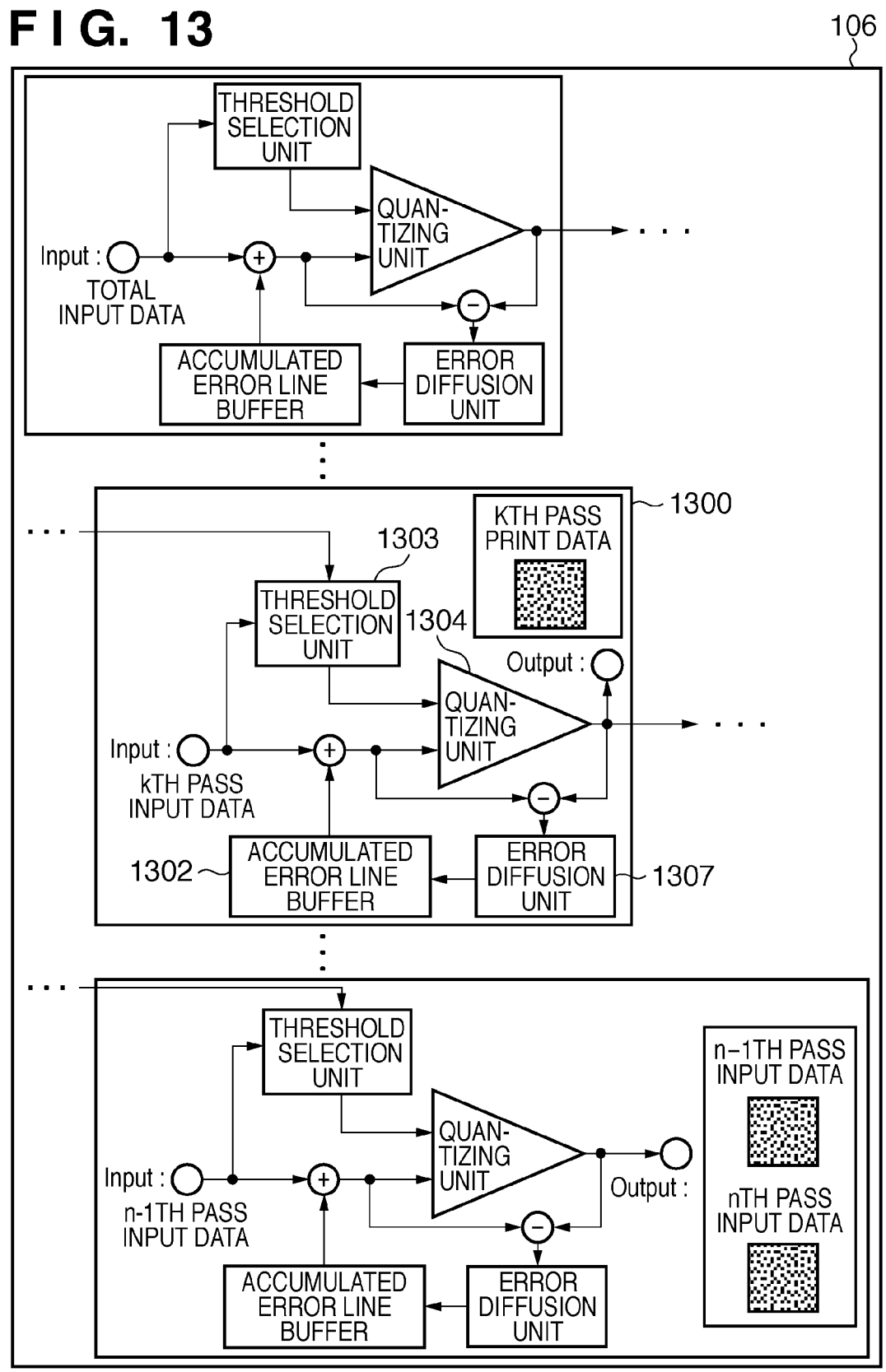
FIG. 13 is an exemplary diagram of the configuration of the halftone processing unit 106 when performing n-pass printing, according to the first embodiment.

Although the above described a case of two-pass printing, the same applies to n-pass printing as well. FIG. 13 is an exemplary diagram of the configuration of the halftone processing unit 106 when performing n-pass printing. In this case, n binarization units are necessary. Descriptions shall be given regarding a binarization unit 1300 that outputs kth pass print data $B_k(x, y)$.

An accumulated error line buffer 1302 and an error diffusion unit 1307 are identical to the accumulated error line buffer 902 and the error diffusion unit 907 respectively shown in FIG. 8, and thus descriptions thereof shall be omitted.

The threshold selection unit 1303 sets a threshold $T_k(I_k(x, y))$ used during the halftone processing. In the present embodiment, the range of pixel values for the kth pass input data is $0 \leq I_k(x, y) \leq \text{ROUND}(255/n)$, and thus the threshold is set as follows.

$$T_k(I_k(x, y))=\text{ROUND}(255/n/2) \qquad (34)$$

Furthermore, the threshold selection unit 1303 outputs B(x, y) and $B_1(x, y)$ to $B_{k-1}(x, y)$, which are the outputs from the binarization units of the previous stages, to a quantizing unit 1304 along with the threshold $T_k$.

The quantizing unit 1304 calculates constraint data based on $B(x, y)$ and $B_1(x, y)$ to $B_{k-1}(x, y)$. The values $B_k(x, y)$ of the kth pass print data are calculated using this constraint data, $T_k(I_k(x, y))$, and $I'_k(x, y)$. Error diffusion using the constraint data is performed by processing the following equations (35) and (36).

When $B(x, y)=255$, $B_k(x, y)=0$ for an arbitrary integer i that fulfils $1 \leq i \leq k-1$, and $I'_k(x, y) \geq T_k(I_k(x, Y))$, $$B_k(x, y)=255 \qquad (35)$$

In all other cases, $$B_k(x, y)=0 \qquad (36)$$

The calculated $B_k(x, y)$ and the output of the binarization units in the previous stages, or $B(x, y)$ and $B_1(x, y)$ to $B_{k-1}(x, y)$, are output to the binary conversion processing unit in the next stage.

Figure 14:
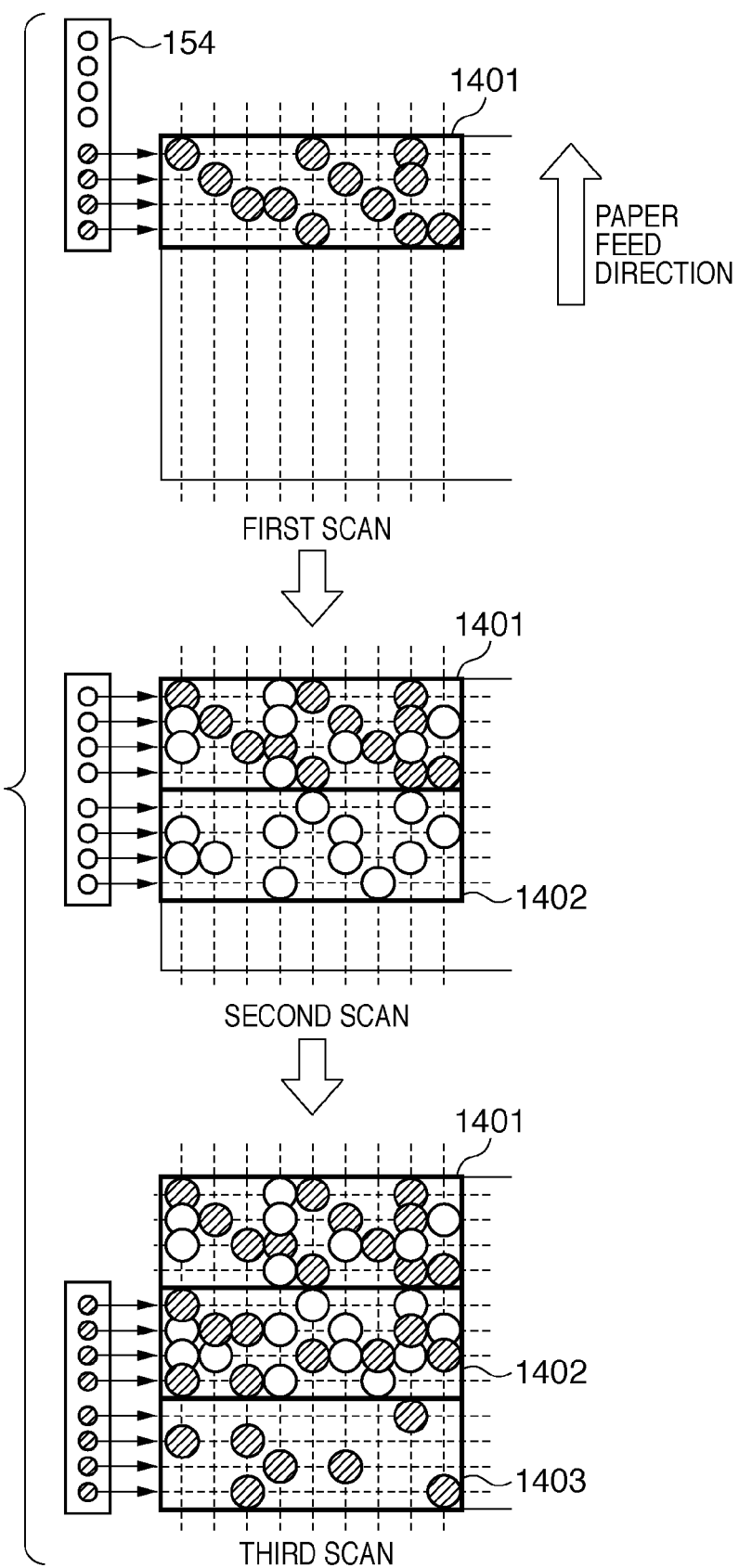
FIG. 14 is a diagram illustrating an exemplary outline of multi-pass recording according to the first embodiment.
Figure 15:
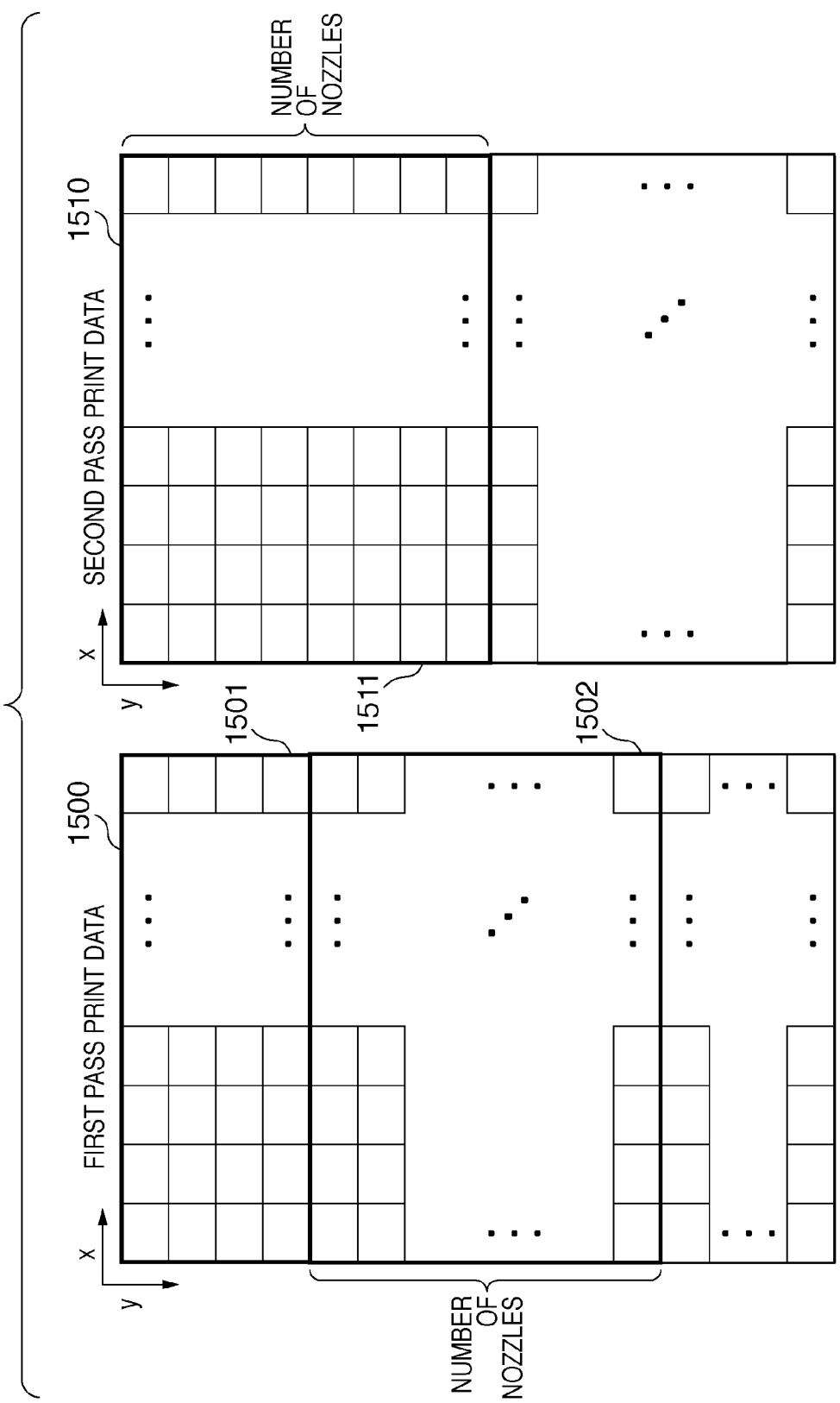
FIG. 15 is a diagram illustrating an example of the structure of pass print data according to the first embodiment.
Figure 16:
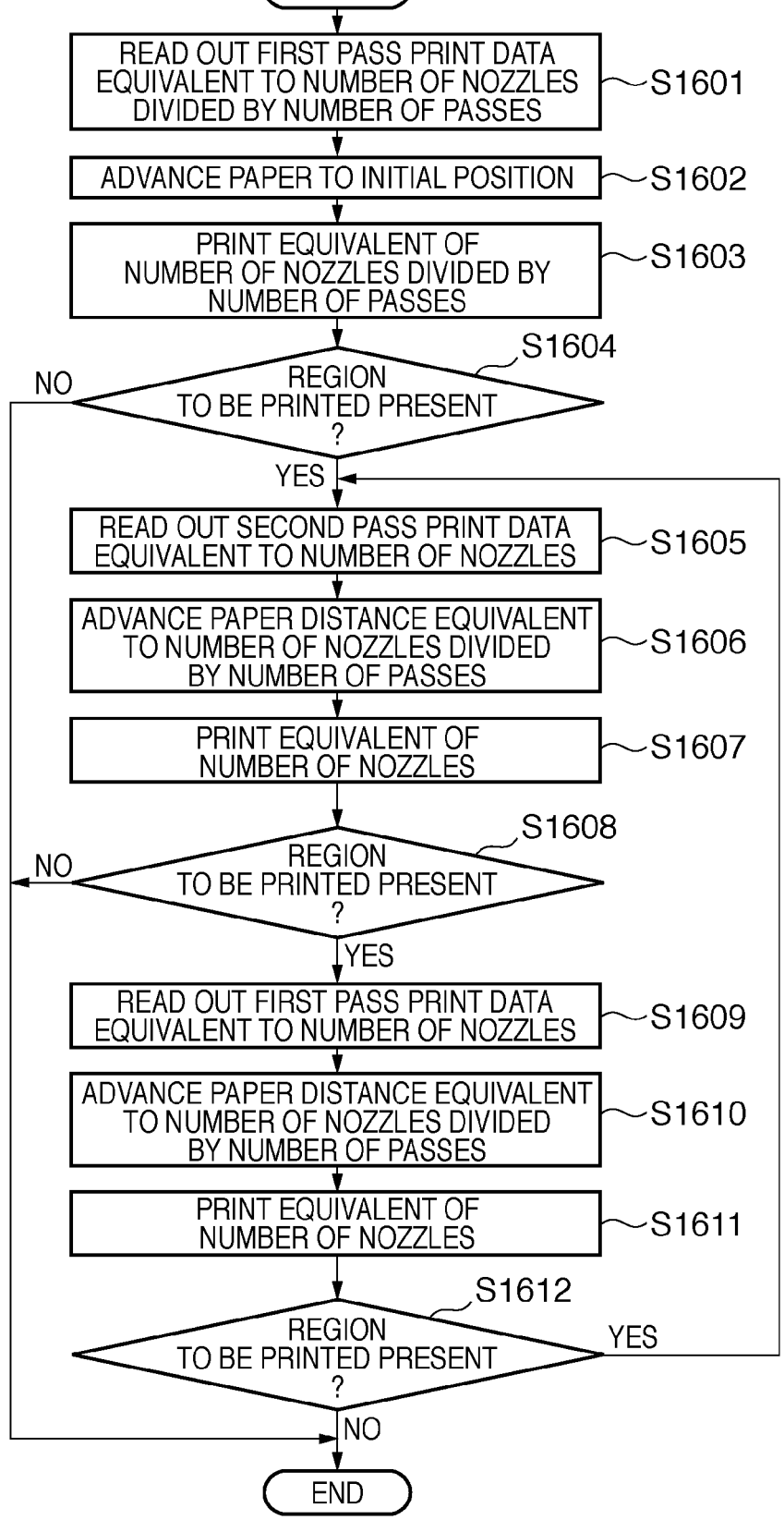
FIG. 16 is a flowchart illustrating an example of print processing according to the first embodiment.
Figure 17:
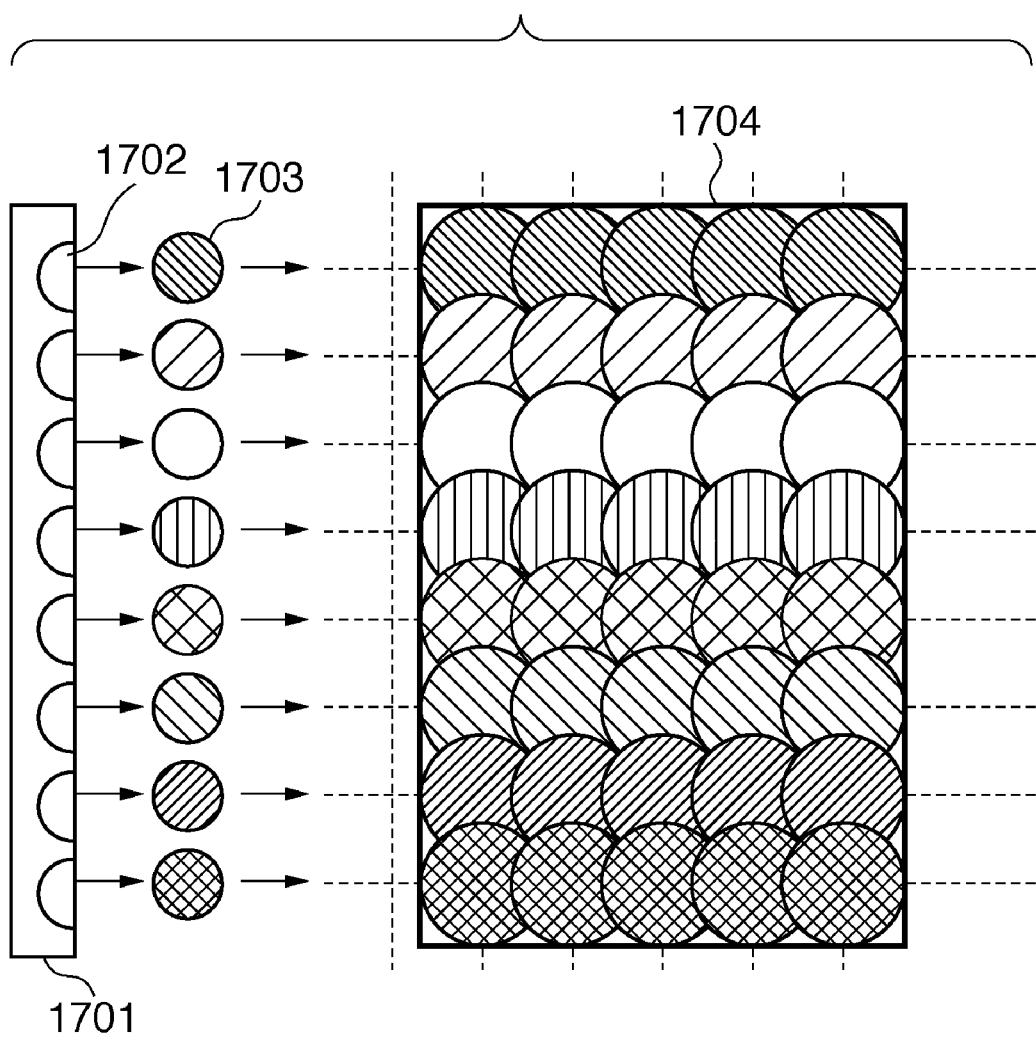
FIG. 17 is a diagram illustrating an example of printing performed using multiple nozzles.
Figure 18:
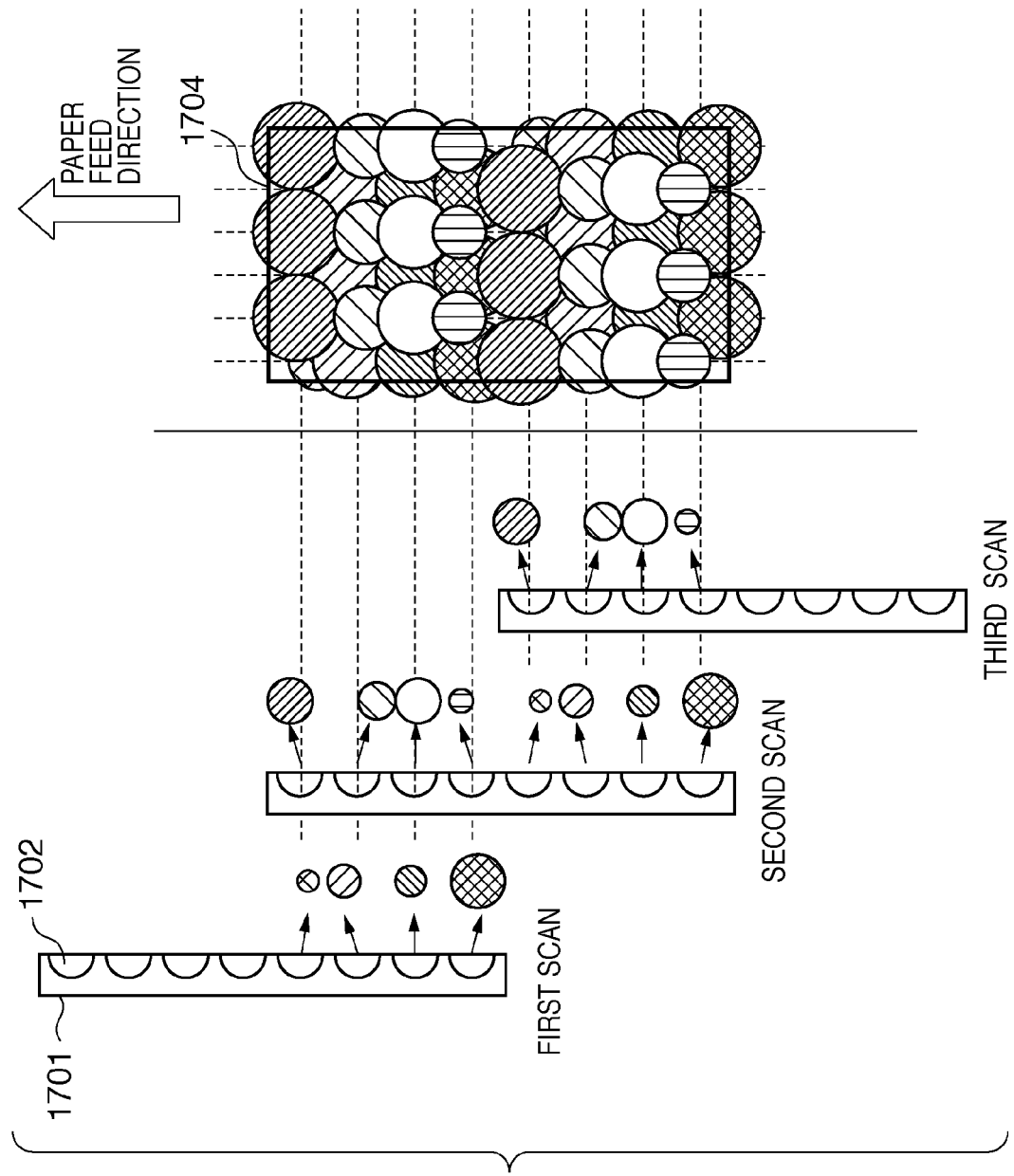
FIG. 18 is a diagram illustrating an example of the multi-pass recording method.
Figure 19:
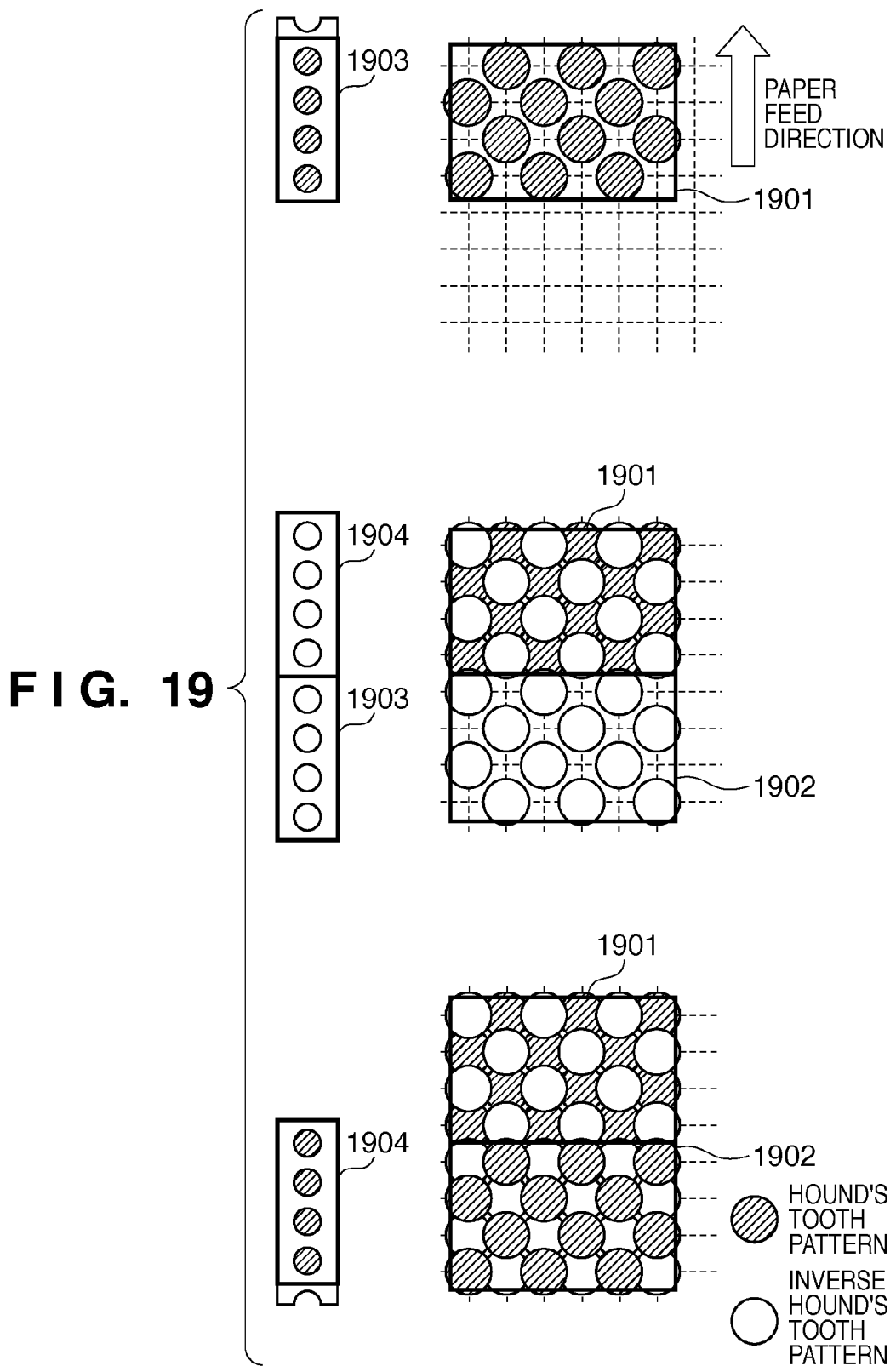
FIG. 19 is a diagram illustrating an example of a masking pattern.
Figure 20:
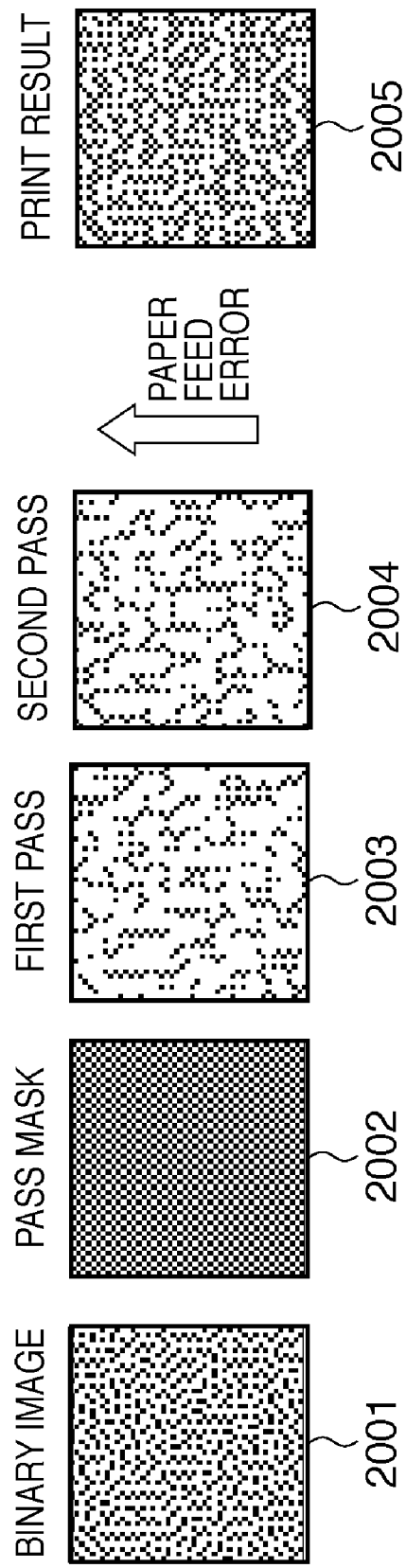
FIG. 20 is a diagram illustrating an example of the state of the multi-pass recording method in the case where a paper feed error has occurred.

Lastly, details of step S409, shown in FIG. 4, shall be described using FIGS. 14 to 16. For the sake of simplicity, the following descriptions discuss an example where the printhead 154 has eight nozzles and two-pass printing is performed for cyan large dots. However, the same process can be utilized when using multiple colors, when performing n-pass printing, and so on.

FIG. 14 is a diagram illustrating an exemplary outline of multi-pass recording. In the first scan, illustrated in the upper section of FIG. 14, the printhead 154 prints first pass print data using a lower nozzle group of four nozzles. As a result, the first printing for a print region 1401 is completed. Next, in the second scan, illustrated in the middle section of FIG. 14, second pass print data is printed using all the nozzles, after the paper has been advanced by a distance equivalent to four nozzles. As a result, the second printing for the print region 1401 and the first printing for a print region 1402 are completed. Finally, in the third scan, illustrated in the lower section of FIG. 14, first pass print data is printed using all the nozzles, after the paper has once again been advanced by a distance equivalent to four nozzles. As a result, the second printing for the print region 1402 and the first printing for a print region 1403 are completed.

FIG. 15 is a diagram illustrating an example of the structure of pass print data. In the first scan, printing is performed in the print region 1401, shown in the upper section of FIG. 14, based on a recording region 1501 in first pass print data 1500. The number of pixels in the y-axis direction of the recording region 1501 is equal to the number of nozzles divided by the number of passes. In the second scan, printing is performed in the print regions 1401 and 1402, shown in the middle section of FIG. 14, based on a recording region 1511 in second pass print data 1510. The number of pixels in the y-axis direction of the recording region 1511 is equal to the number of nozzles. In the third scan, printing is performed in the print regions 1402 and 1403, shown in the lower section of FIG. 14, based on a recording region 1502 in the first pass print data 1500. The number of pixels in the y-axis direction of the recording region 1502 is equal to the number of nozzles.

FIG. 16 is a flowchart illustrating an example of print processing. This flowchart is processed by the CPU 201 executing a computer program written into the ROM 203.

In step S1601, the image forming apparatus 100 reads out print data of an amount equivalent to the number of nozzles divided by the number of passes in the y-axis direction, starting with the beginning of the first pass print data, from the storage region of the image storage memory 107, and transfers the read-out data to the image storage memory 151 within the printer 150. In the example shown in FIG. 14, the data of the recording region 1501 is transferred.

In step S1602, the conveying unit 156 advances the recording medium so that it arrives at an initial position.

In step S1603, the image forming apparatus 100 prints the print data recorded in the image storage memory 151 using the lower nozzle group of the printhead 154.

In step S1604, the image forming apparatus determines whether or not there remains a region that is to be printed. In the case where such a region remains ("YES" in step S1604), the process advances to step S1605. However, in the case where no such region remains ("NO" in step S1604), the print processing ends.

In step S1605, the image forming apparatus reads out second pass print data of an amount equivalent to the number of nozzles in the y-axis direction from the image storage memory 107, and transfers the read-out data to the image storage memory 151.

In step S1606, the conveying unit 156 advances the paper by a distance equivalent to the number of nozzles divided by the number of passes.

In step S1607, the image forming apparatus prints the print data recorded in the image storage memory 151 using all the nozzles of the printhead 154.

In step S1608, the image forming apparatus determines whether or not there remains a region that is to be printed. In the case where such a region remains ("YES" in step S1608), the process advances to step S1609. However, in the case where no such region remains ("NO" in step S1608), the print processing ends.

In step S1609, the image forming apparatus 100 reads out first pass print data of an amount equivalent to the number of nozzles in the y-axis direction from the image storage memory 107, and transfers the read-out data to the image storage memory 151.

In step S1610, the conveying unit 156 advances the paper by a distance equivalent to the number of nozzles divided by the number of passes.

In step S1611, the image forming apparatus 100 prints the print data recorded in the image storage memory 151 using all the nozzles of the printhead 154.

In step S1612, the image forming apparatus 100 determines whether or not there remains a region that is to be printed. In the case where such a region remains ("YES" in step S1612), the process returns to step S1605. However, in the case where no such region remains ("NO" in step S1612), the print processing ends. The above has been a detailed description of the print processing of step S409.

When output dot patterns for each pass in the multi-pass recording method are calculated according to the present embodiment, the dispersity between the dot arrangements in the first and second passes increases. As a result, a high dispersity in the dot arrangements can be ensured in the output image, thus making it possible to prevent image degradation due to paper feed errors. Furthermore, according to the present embodiment, it is also possible to prevent image degradation caused by skew in the dot impact locations among passes in the main scanning direction. Such skew in the main scanning direction occurs due to, for example, the position at which the printhead starts printing changing between passes.

Other Embodiments

The embodiment described thus far used an image forming apparatus provided in a recording apparatus that uses the inkjet recording system. With the inkjet recording system, an image is formed by causing a printhead having multiple nozzles arranged in a predetermined direction to pass above a recording medium in a direction intersecting with the direction in which the nozzles are arranged and discharge ink onto the recording medium. However, the present invention can also be applied to recording apparatus that record according to another system aside from the inkjet system. In such a case, the nozzles that discharge ink droplets correspond to recording elements that record dots.

The present invention can also be applied to other recording apparatuses, aside from a serial-type recording apparatus (printer), that record by moving a printhead relative to a recording medium, such as what is called a full-line recording apparatus. Full-line recording apparatuses have a printhead of a length corresponding to the recording width of the recording medium, and record by moving the recording medium relative to the printhead.

In the embodiment described above, the error diffusion method is described as being used for the halftone processing. However, the halftone processing for calculating the total print data is not limited to the error diffusion method; the mean minimum error method, of the same type, or the ordered dithering method can also be used for the halftone processing. This is because, as described using FIGS. 21 and 22, when the total print data 2101 is calculated from the total input data 2100, there is no need to consider constraints; simply performing the halftone processing is sufficient.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Laid-Open No. 2008-116293, filed Apr. 25, 2008, which is hereby incorporated by reference herein in its entirety.

What is claimed is:

1. An image forming apparatus that generates N pieces of print data representing dot patterns to be printed on the same region of a recording medium to form an image represented by image data, the apparatus comprising:
   an obtaining unit configured to obtain constraint data that specifies non-print pixels obtained from a result of halftone processing to the image data;
   a division unit configured to divide each pixel value of the image data into N values to generate N pieces of input data;
   a generation unit configured to generate the N pieces of print data, wherein the generation unit generates at least one of the N pieces of print data by converting the input data by halftone processing that uses the constraint data; and
   an updating unit configured to update the constraint data by adding print pixels of k pieces of print data that have been already generated to the constraint data as non-print pixels when the generation unit generates k+1th piece of print data by the conversion.

2. The apparatus according to claim 1, wherein the generation unit generates the Nth piece of print data based on print pixels of N-1 pieces of print data that have been already generated and the result of the halftone processing to the image data.

3. The apparatus according to claim 1, wherein the generation unit determines an output value of each pixel of print data obtained by the conversion based on the constraint data and a threshold value used in the halftone processing.

4. The apparatus according to claim 1, wherein the generation unit performs the halftone processing using error diffusion method.

5. The apparatus according to claim 1, wherein the constraint data obtained by the obtaining unit is obtained by a result of halftone processing using any of the error diffusion method, the mean minimum error method or the ordered dithering method.

6. A method for generating N pieces of print data representing dot patterns to be printed on the same region of a recording medium to form an image represented by image data, the method comprising the steps of:
   obtaining constraint data that specifies non-print pixels obtained from a result of halftone processing to the image data;
   dividing each pixel value of the image data into N values to generate N pieces of input data;
   generating the N pieces of print data, wherein at least one of the N pieces of print data is generated by converting the input data by halftone processing that uses the constraint data; and
   updating the constraint data by adding print pixels of k pieces of print data that have been already generated to the constraint data as non-print pixels when the generation unit generates k+1th piece of print data by the conversion.

7. A computer-readable non-transitory storage medium in which is stored a computer program for causing a computer to execute a method for generating N pieces of print data representing dot patterns to be printed on the same region of a recording medium to form an image represented by image data, the method comprising:
   obtaining constraint data that specifies non-print pixels obtained from a result of halftone processing to the image data;
   dividing each pixel value of the image data into N values to generate N pieces of input data;
   generating the N pieces of print data, wherein at least one of the N pieces of print data is generated by converting the input data by halftone processing that uses the constraint data; and
   updating the constraint data by adding print pixels of k pieces of print data that have been already generated to the constraint data as non-print pixels when the generation unit generates k+1th piece of print data by the conversion.

* * * * *